United States Patent
Blackhurst et al.

(10) Patent No.: US 9,519,895 B2
(45) Date of Patent: *Dec. 13, 2016

(54) GIFT CARD ASSOCIATION WITH ACCOUNT

(71) Applicant: BANK OF AMERICA CORPORATION, Charlotte, NC (US)

(72) Inventors: Jason Blackhurst, Charlotte, NC (US); Dean Lyons Henry, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,145

(22) Filed: Feb. 18, 2016

(65) Prior Publication Data

US 2016/0162853 A1   Jun. 9, 2016

Related U.S. Application Data

(63) Continuation of application No. 13/619,732, filed on Sep. 14, 2012, now Pat. No. 9,355,392.

(51) Int. Cl.

| | |
|---|---|
| *G06Q 40/00* | (2012.01) |
| *G06Q 20/10* | (2012.01) |
| *G06Q 20/28* | (2012.01) |
| *G06Q 20/32* | (2012.01) |
| *G06Q 20/34* | (2012.01) |
| *G06Q 20/40* | (2012.01) |
| *G06K 9/00* | (2006.01) |
| *G06Q 20/22* | (2012.01) |
| *G06Q 20/36* | (2012.01) |

(52) U.S. Cl.
CPC ......... *G06Q 20/105* (2013.01); *G06K 9/00442* (2013.01); *G06Q 20/10* (2013.01); *G06Q 20/227* (2013.01); *G06Q 20/28* (2013.01); *G06Q 20/3276* (2013.01); *G06Q 20/3278* (2013.01); *G06Q 20/34* (2013.01); *G06Q 20/342* (2013.01); *G06Q 20/363* (2013.01); *G06Q 20/405* (2013.01)

(58) Field of Classification Search
USPC .......................................... 705/35, 39, 41, 44
See application file for complete search history.

(56) References Cited

U.S. PATENT DOCUMENTS

| | | | |
|---|---|---|---|
| 7,753,264 | B2 | 7/2010 | Shafer et al. |
| 7,765,124 | B2 | 7/2010 | Postrel |
| 7,895,120 | B2 | 2/2011 | Walker et al. |
| 8,180,706 | B2 | 5/2012 | Bishop et al. |
| 8,590,785 | B1 | 11/2013 | Mesaros |
| 8,660,965 | B1 | 2/2014 | Bickerstaff |
| 8,733,637 | B1 | 5/2014 | Cedeno |

(Continued)

OTHER PUBLICATIONS

The Laws, Regulations, Guidelines, and Industry Practices that Consumers Who Use Gift Cards; Phillip Keitel; Jul. 2008.

(Continued)

*Primary Examiner* — Lalita M Hamilton
(74) *Attorney, Agent, or Firm* — Michael A. Springs; Moore & Van Allen PLLC; W. Kevin Ransom

(57) ABSTRACT

Embodiments of the invention are directed to systems, methods and computer program products for associating gift cards with accounts. An exemplary apparatus is configured to: receive information associated with a gift card; associate the gift card with the account; receive information associated with a transaction; determine the transaction qualifies for the gift card; and apply funds associated with the gift card to the transaction.

17 Claims, 18 Drawing Sheets

(56) References Cited

U.S. PATENT DOCUMENTS

| | | |
|---|---|---|
| 8,799,087 B2 | 8/2014 | Martin et al. |
| 8,909,771 B2 | 12/2014 | Heath |
| 8,973,819 B2 | 3/2015 | Blackhurst et al. |
| 2004/0006478 A1 | 1/2004 | Alpdemir et al. |
| 2005/0197919 A1 | 9/2005 | Robertson |
| 2005/0228717 A1 | 10/2005 | Gusler et al. |
| 2006/0027647 A1 | 2/2006 | Deane et al. |
| 2009/0006212 A1 | 1/2009 | Krajicek et al. |
| 2009/0037275 A1 | 2/2009 | Pollio |
| 2009/0287564 A1 | 11/2009 | Bishop et al. |
| 2010/0010918 A1 | 1/2010 | Hunt |
| 2010/0030578 A1 | 2/2010 | Siddique et al. |
| 2010/0051689 A1 | 3/2010 | Diamond |
| 2010/0096449 A1 | 4/2010 | Denzer et al. |
| 2011/0010238 A1 | 1/2011 | Postrel |
| 2012/0003002 A1 | 1/2012 | Hashimoto |
| 2012/0059701 A1 | 3/2012 | van der Veen et al. |
| 2012/0136780 A1 | 5/2012 | El-Awady et al. |
| 2012/0143759 A1 | 6/2012 | Ritorto, Jr. et al. |
| 2012/0150731 A1 | 6/2012 | Isaacson |
| 2012/0150740 A1 | 6/2012 | Isaacson et al. |
| 2012/0221397 A1 | 8/2012 | Roe et al. |
| 2012/0310826 A1 | 12/2012 | Chatterjee |
| 2012/0316941 A1 | 12/2012 | Moshfeghi |
| 2012/0316992 A1 | 12/2012 | Oborne |
| 2012/0323765 A1 | 12/2012 | Spaulding et al. |
| 2013/0161381 A1 | 6/2013 | Roundtree et al. |
| 2013/0191195 A1 | 7/2013 | Carlson et al. |
| 2013/0191213 A1 | 7/2013 | Beck et al. |
| 2013/0254102 A1 | 9/2013 | Royyuru |
| 2013/0334304 A1 | 12/2013 | Yankovich et al. |
| 2013/0346302 A1 | 12/2013 | Purves et al. |
| 2016/0162868 A1 | 6/2016 | Blackhurst et al. |

OTHER PUBLICATIONS

MasterCard 2005.
PrePaid Gift Cards; May 2012.

GIFT CARD ASSOCIATION WITH ACCOUNT

CROSS-REFERENCE OF RELATED APPLICATIONS

This application is a continuation of U.S. patent application Ser. No. 13/619,732, filed Sep. 14, 2012 entitled "Gift Card Association with Account," the contents of which are hereby incorporated by reference.

BACKGROUND

A gift card is a monetary amount that issued by a merchant to be redeemed for purchases associated with merchants. There is a need for updating the process of how gift cards work.

BRIEF SUMMARY

Embodiments of the invention are directed to systems, methods, and computer program products for associating a gift card with an account. In some embodiments, an apparatus is provided for associating a gift card with an account. The apparatus comprises a memory; a processor; and a module stored in the memory, executable by the processor, and configured to: receive information associated with a gift card; associate the gift card with the account; receive information associated with a transaction; determine the transaction qualifies for the gift card; and apply funds associated with the gift card to the transaction.

In some embodiments, the module is configured to associate funds associated with the gift card with a transaction associated with a merchant that issued the gift card.

In some embodiments, the transaction qualifies for the gift card if the transaction is associated with a merchant that issued the gift card.

In some embodiments, the transaction qualifies for the gift card if the transaction is associated with a predetermined type of purchase.

In some embodiments, the transaction is executed using a payment method associated with the account, and wherein the transaction is not executed using the gift card.

In some embodiments, the payment method comprises at least one of a payment card payment, an electronic funds transfer, or a mobile device payment.

In some embodiments, the applying funds associated with the gift card to the transaction comprises in response to determining an amount associated with the transaction is greater than an amount associated with the gift card, applying funds associated with the gift card to the transaction, and applying general funds associated with the account to a remainder of the transaction.

In some embodiments, the applying funds associated with the gift card to the transaction comprises applying general funds associated with the account to the transaction when the transaction occurs, and after a predetermined period, reducing a balance of the gift card by an amount of the transaction and increasing a balance of the general funds by the amount of the transaction.

In some embodiments, the receiving information associated with the gift card comprises at least one of receiving an image of the gift card, receiving readable indicia associated with the gift card, or receiving manual input associated with the gift card.

In some embodiments, the readable indicia is comprised at least one of a visual or non-visual code.

In some embodiments, the readable indicia is comprised in a tag that transmits information wirelessly.

In some embodiments, the gift card comprises a plurality of gift cards.

In some embodiments, the account comprises a financial institution account.

In some embodiments, the financial institution account comprises at least one of a credit account or a debit account.

In some embodiments, the module is configured to communicate with the merchant to redeem the gift card.

In some embodiments, the module is configured to communicate with the merchant to redeem the gift card before, substantially simultaneously with, or after receiving information associated with the transaction.

In some embodiments, funds associated with the gift card comprise gift card funds, and wherein the module is configured to add extra funds to the gift card funds.

In some embodiments, the gift card is categorized based on at least one of a location associated with a merchant associated with the gift card, a type associated with the gift card, an amount associated with the gift card, an expiry date associated with the gift card, or a user associated with the gift card.

In some embodiments, a method is provided for associating a gift card with an account. The method comprises: receiving information associated with a gift card; associating the gift card with the account; receiving information associated with a transaction; determining the transaction qualifies for the gift card; and applying funds associated with the gift card to the transaction.

In some embodiments, a computer program product is provided for associating a gift card with an account. The computer program product comprises a non-transitory computer-readable medium comprising a set of codes for causing a computer to: receive information associated with a gift card; associate the gift card with the account; receive information associated with a transaction; determine the transaction qualifies for the gift card; and apply funds associated with the gift card to the transaction.

BRIEF DESCRIPTION OF THE DRAWINGS

Figure 1:
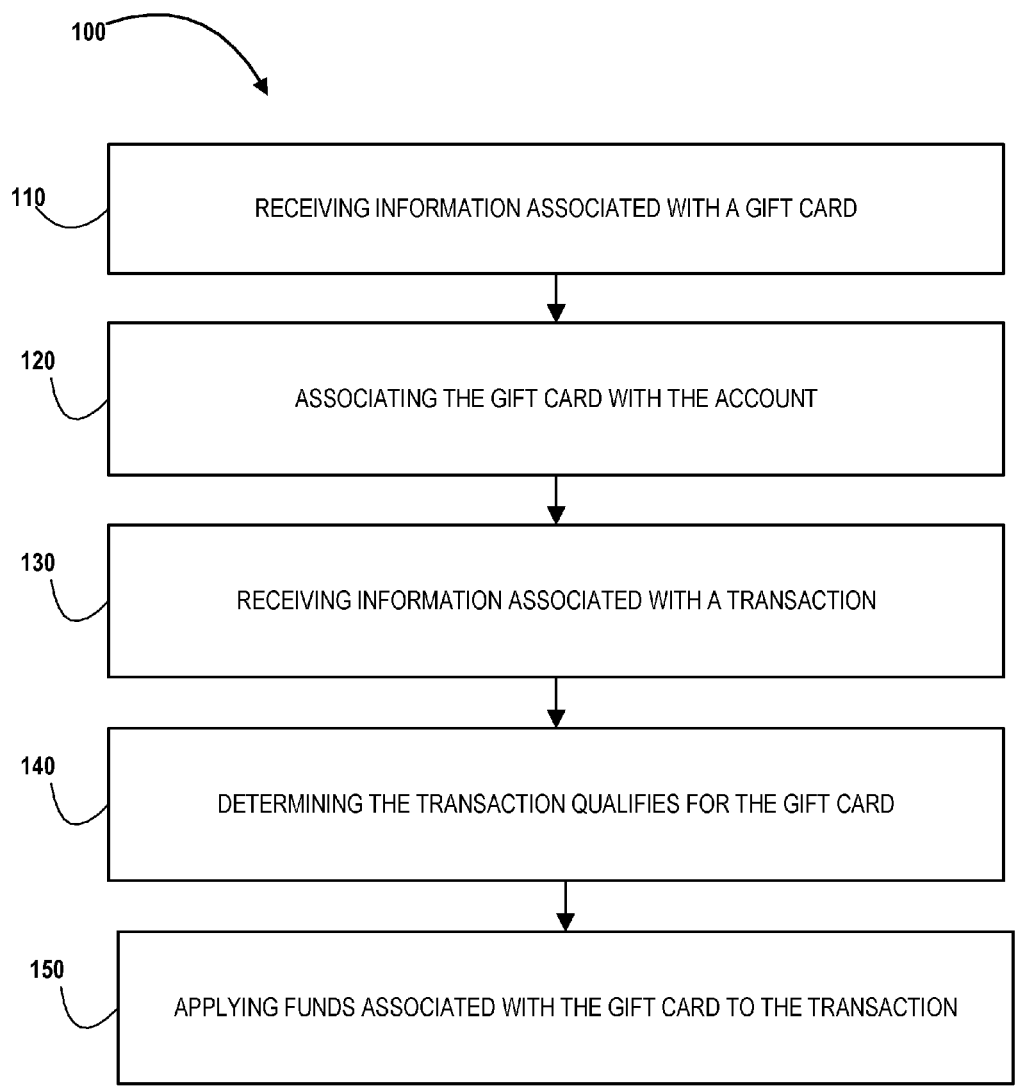
Figure 2:
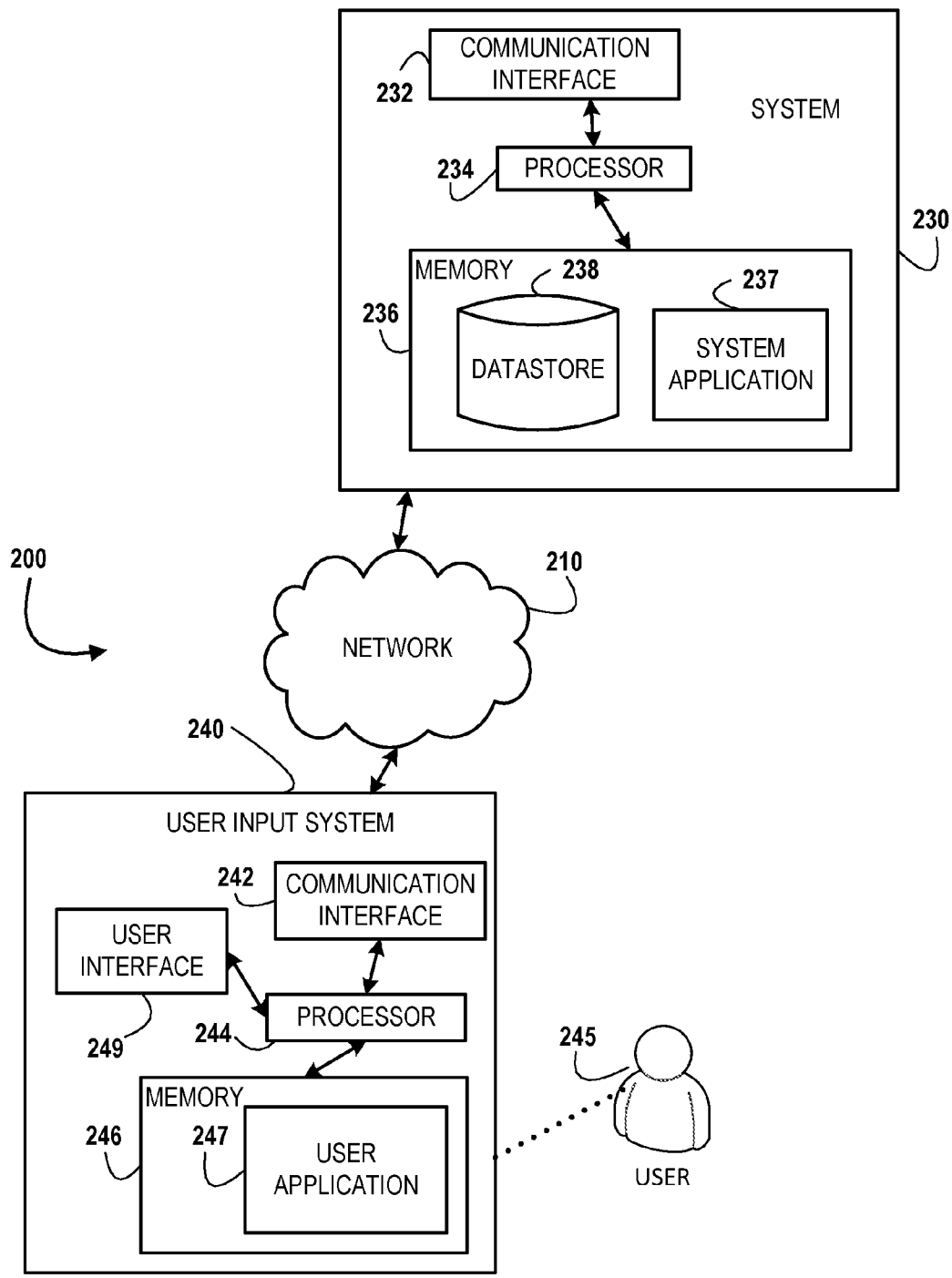
Figure 3:
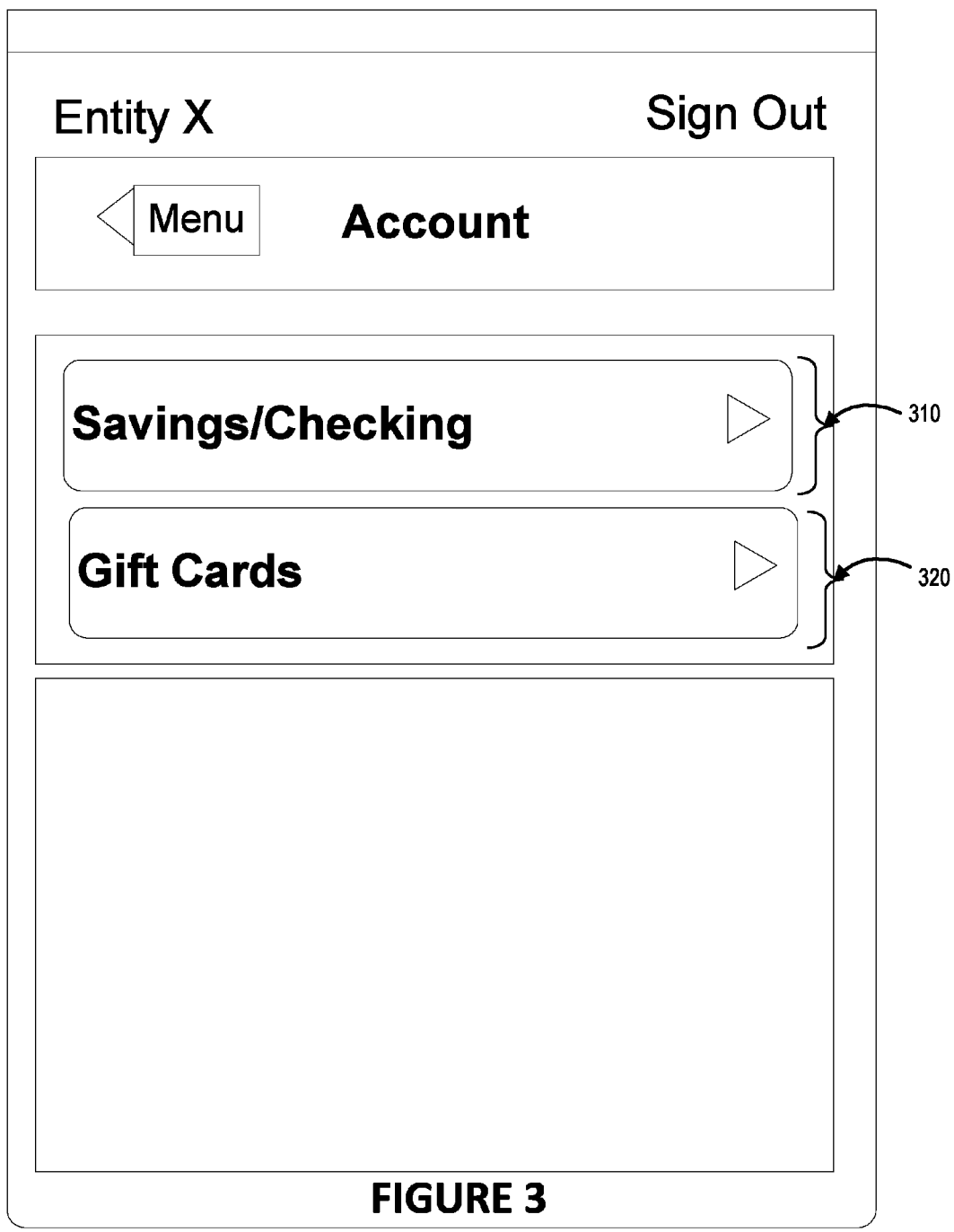
Figure 4:
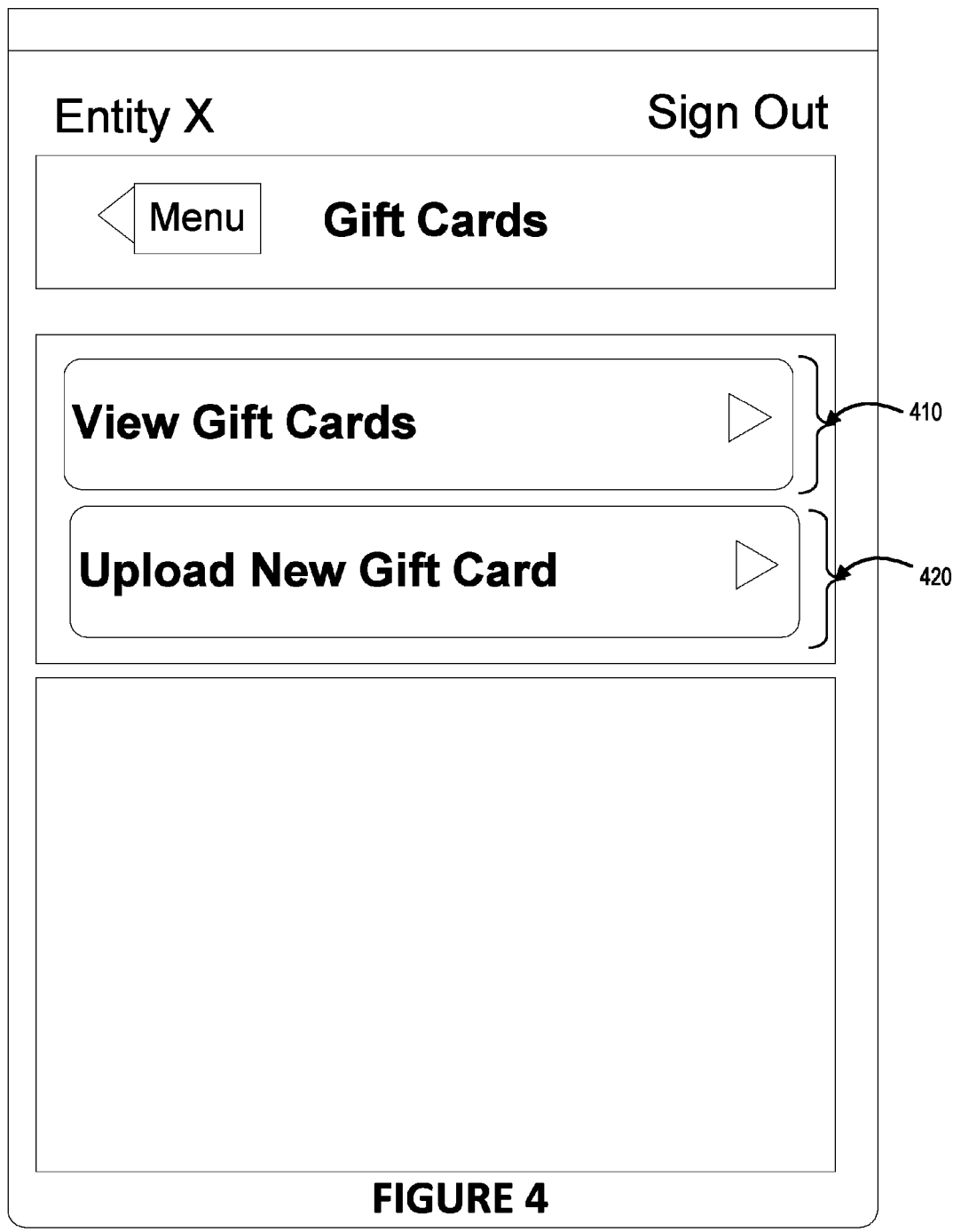
Figure 8:
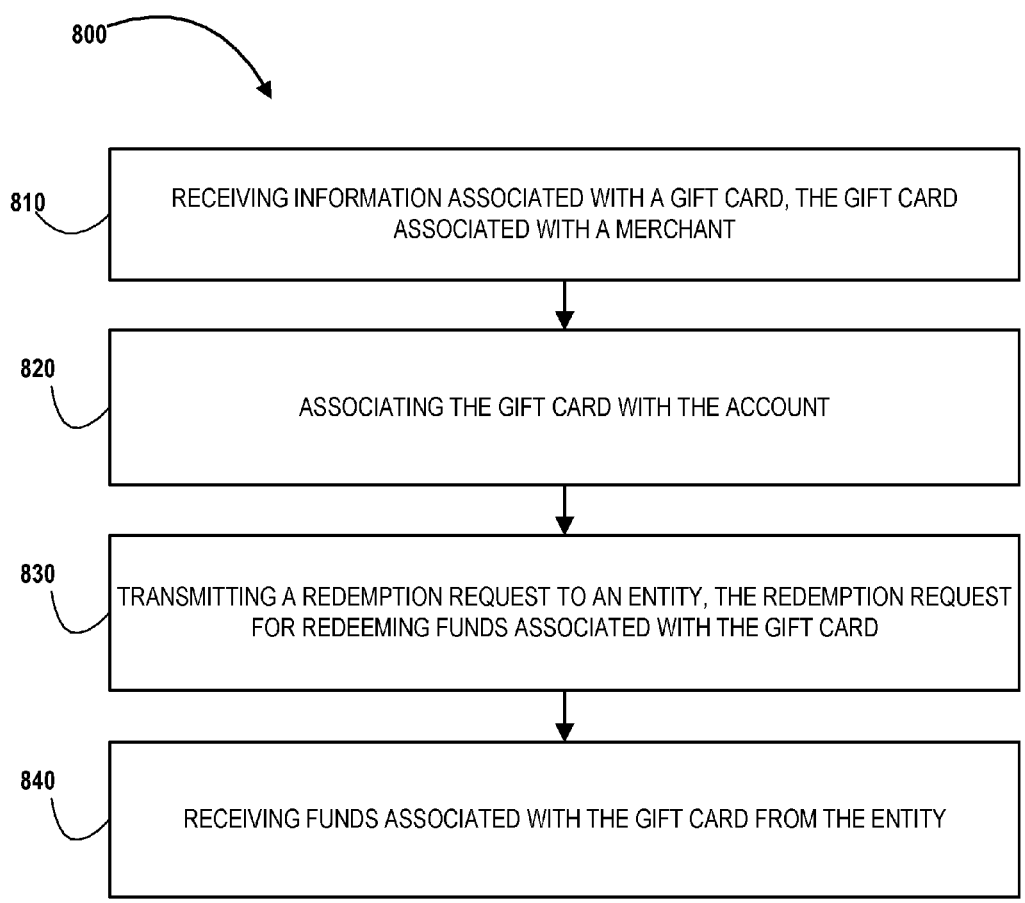
Figure 9:
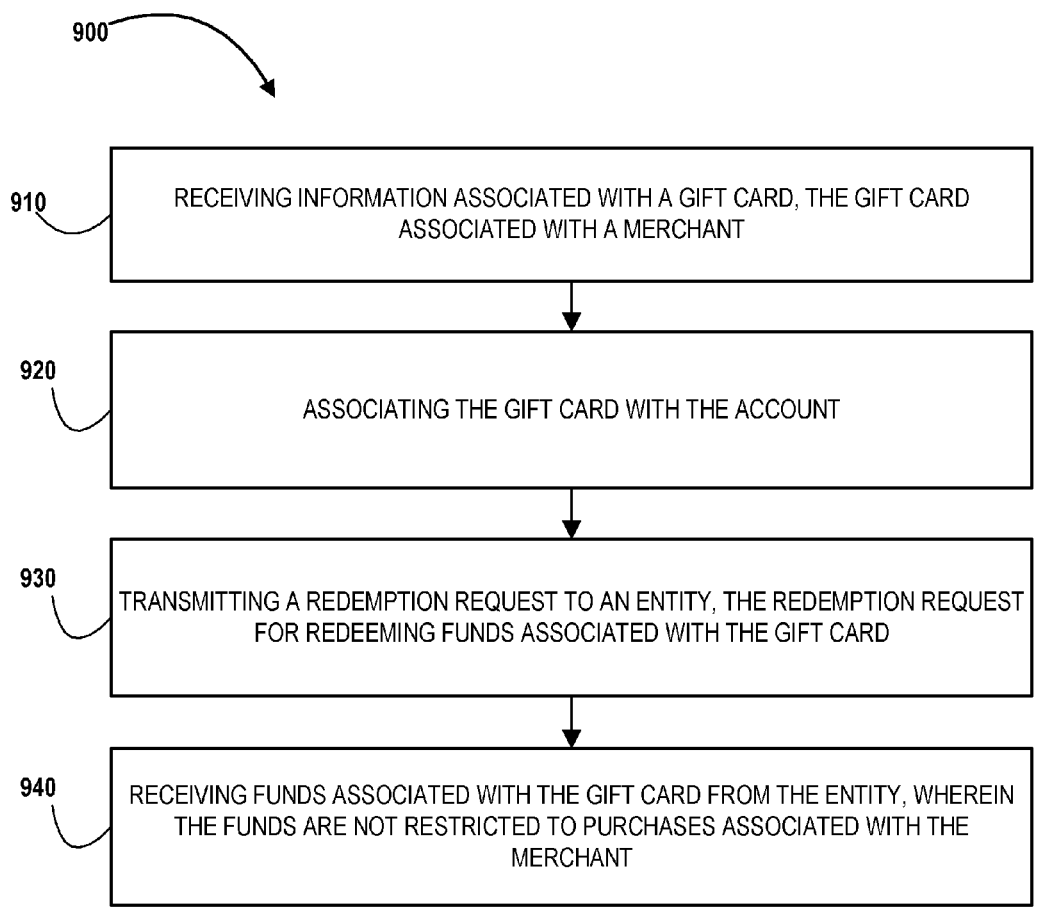
Figure 10:
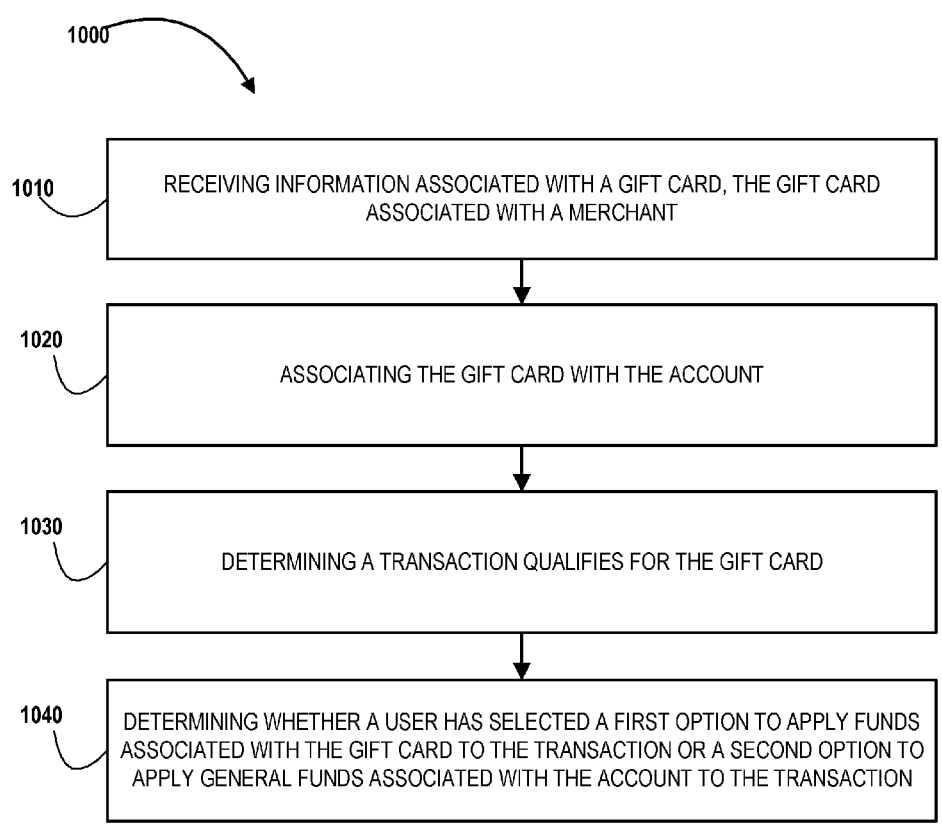
Figure 11:
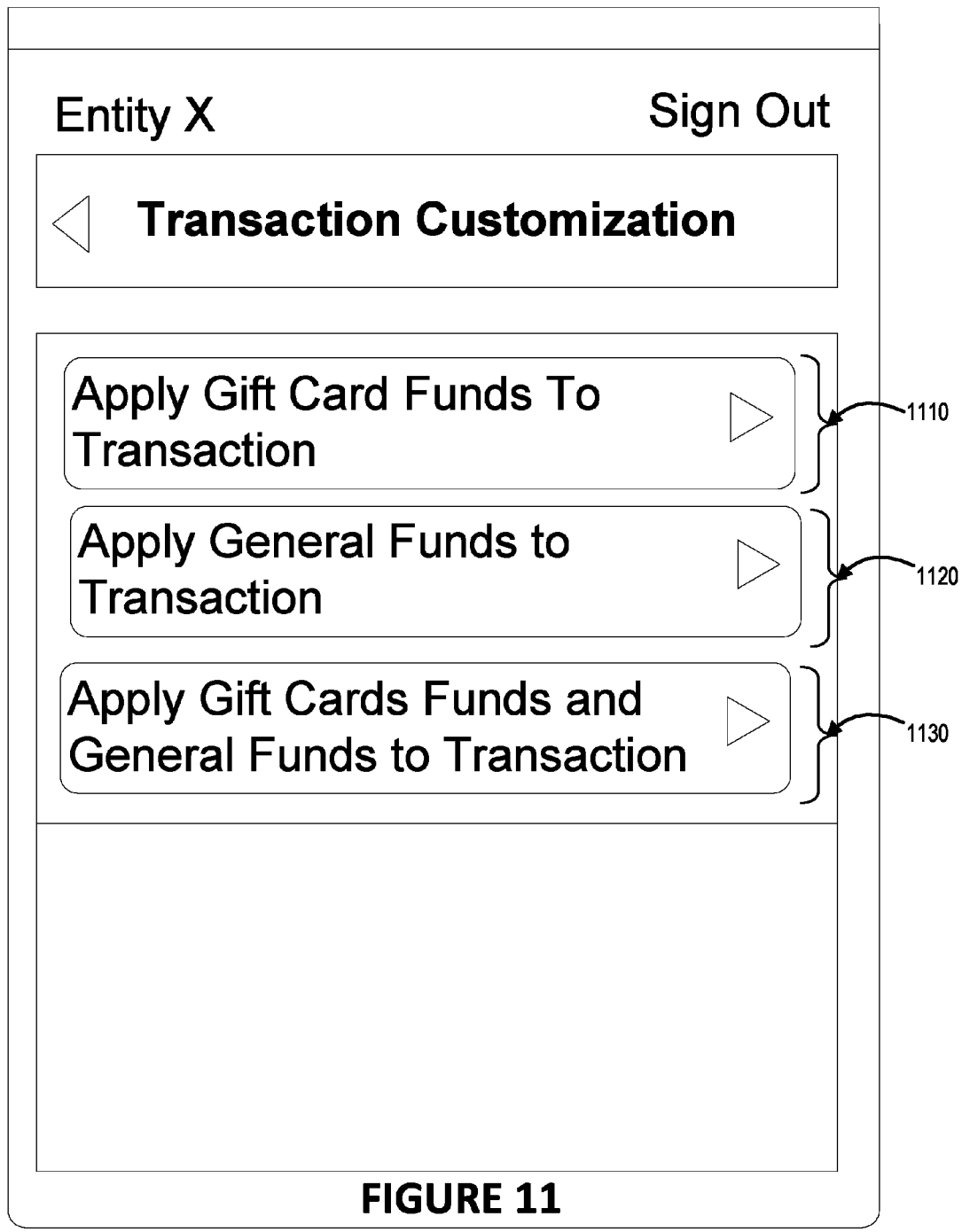
Figure 12:
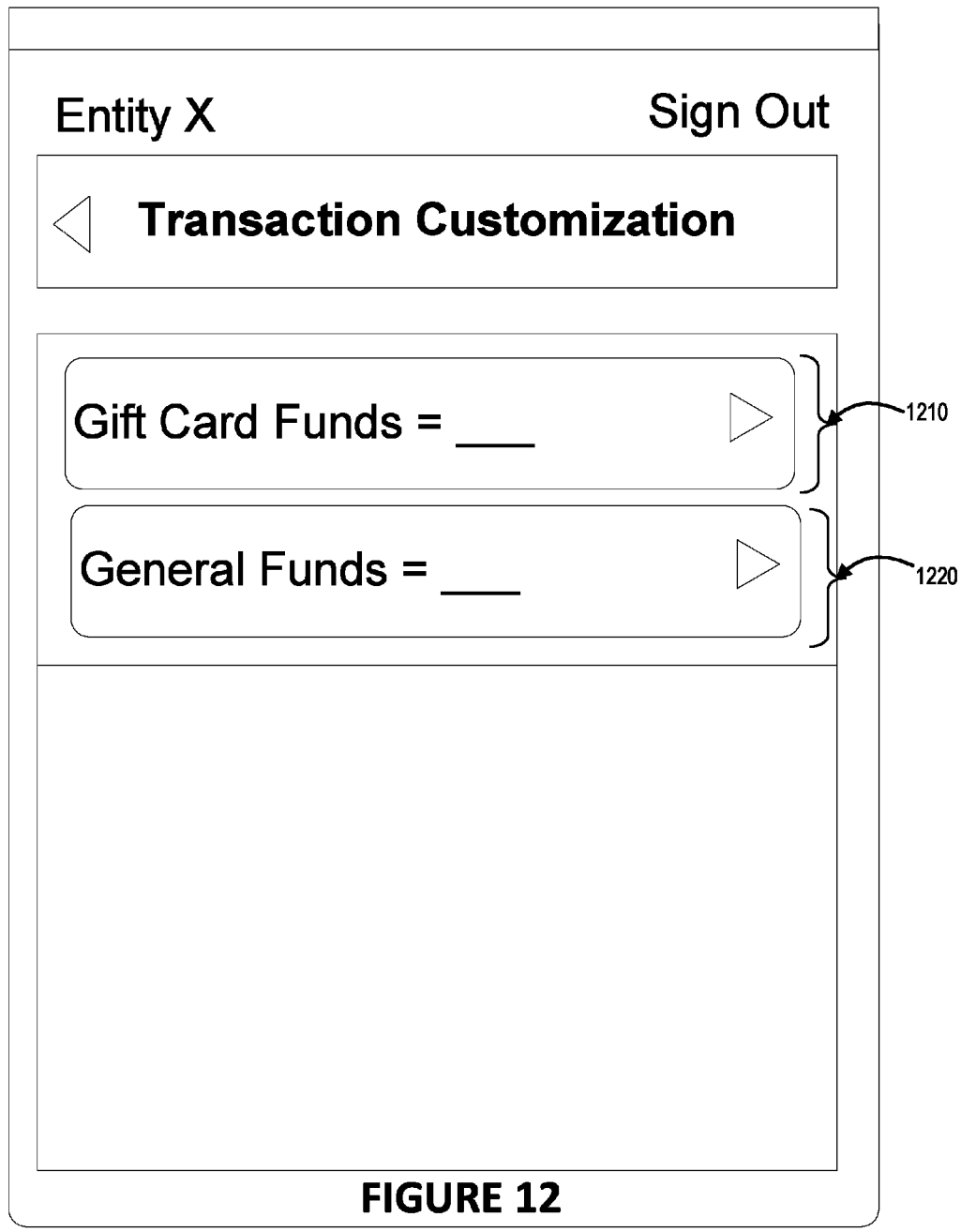
Figure 13:
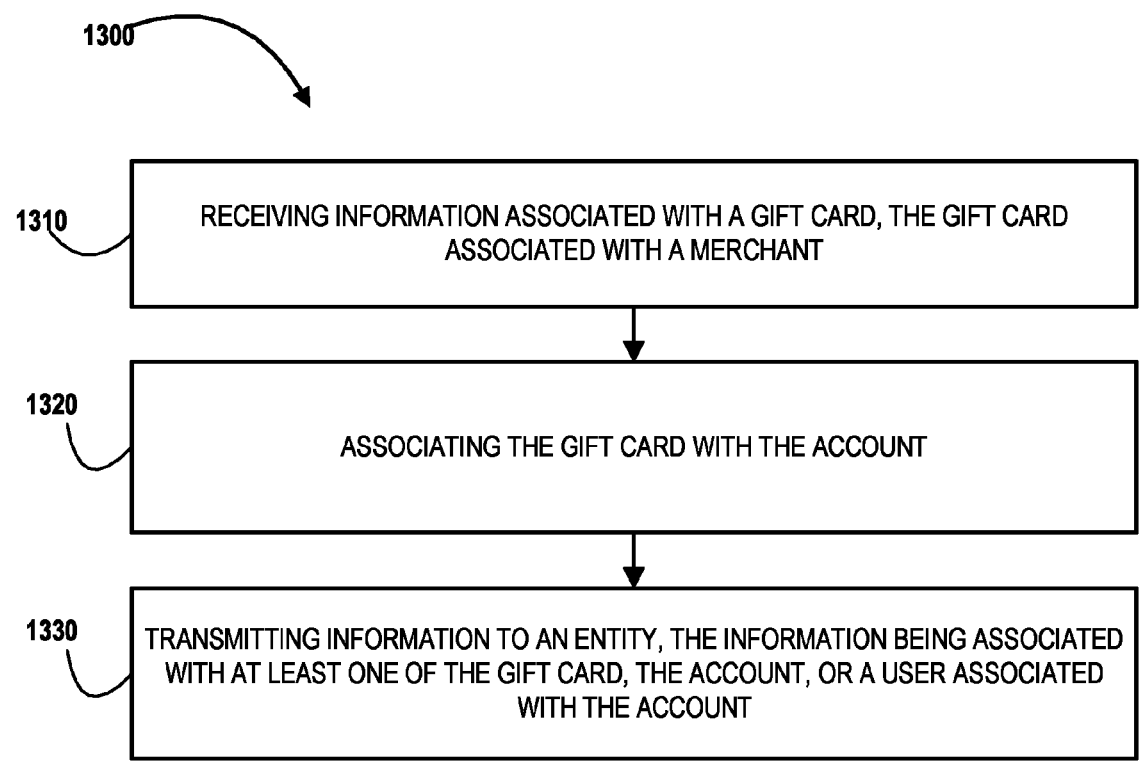
Figure 14:
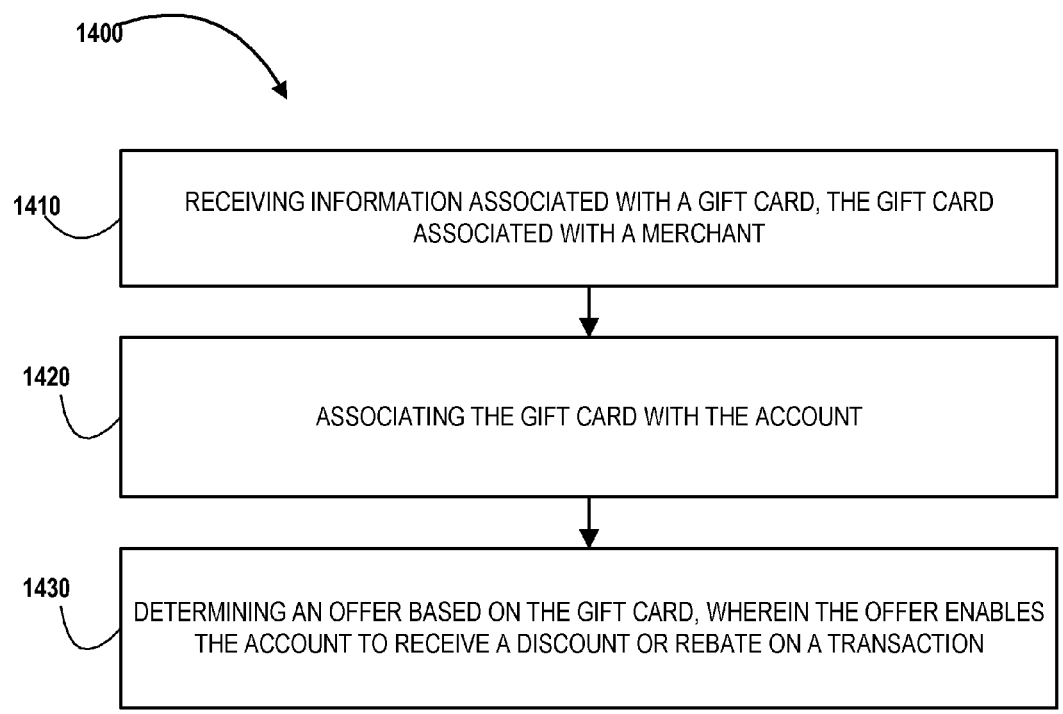
Figure 15:
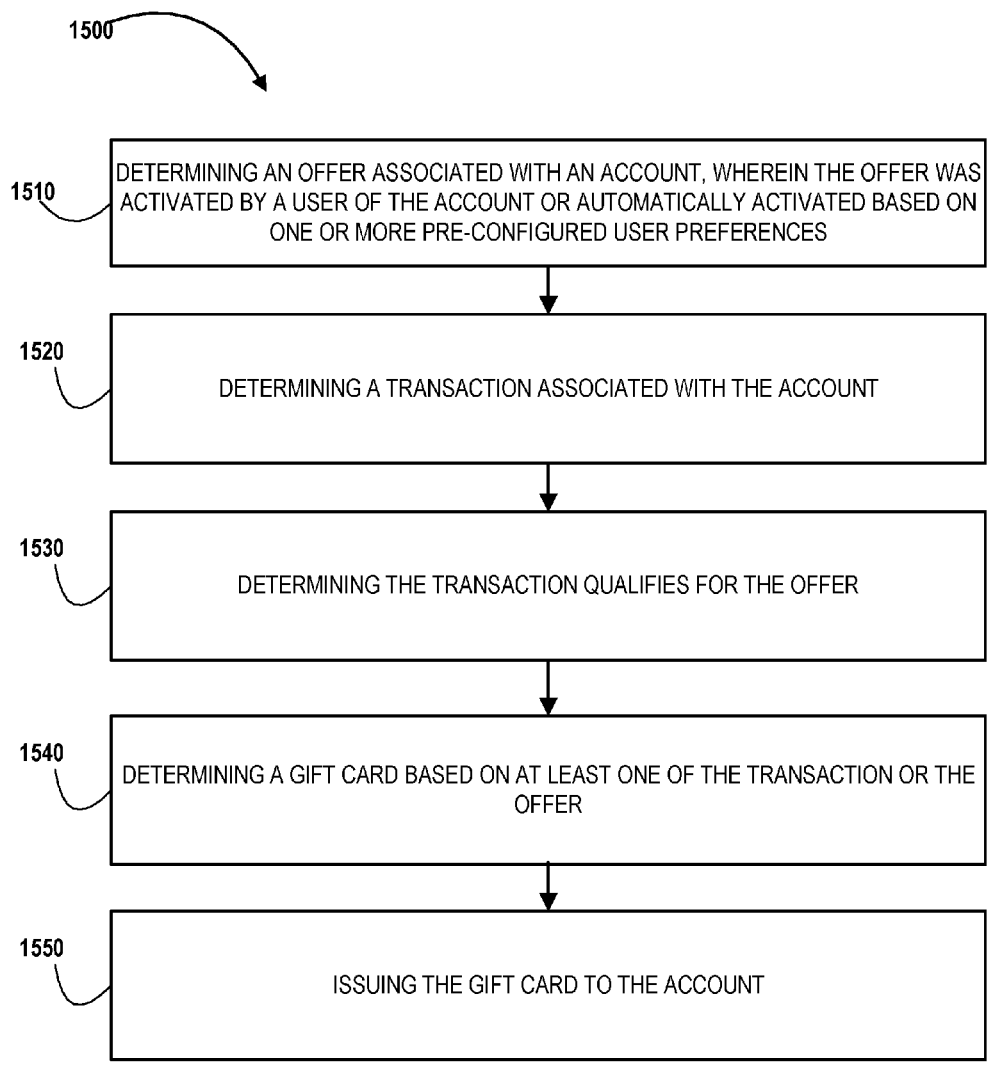
Figure 16:
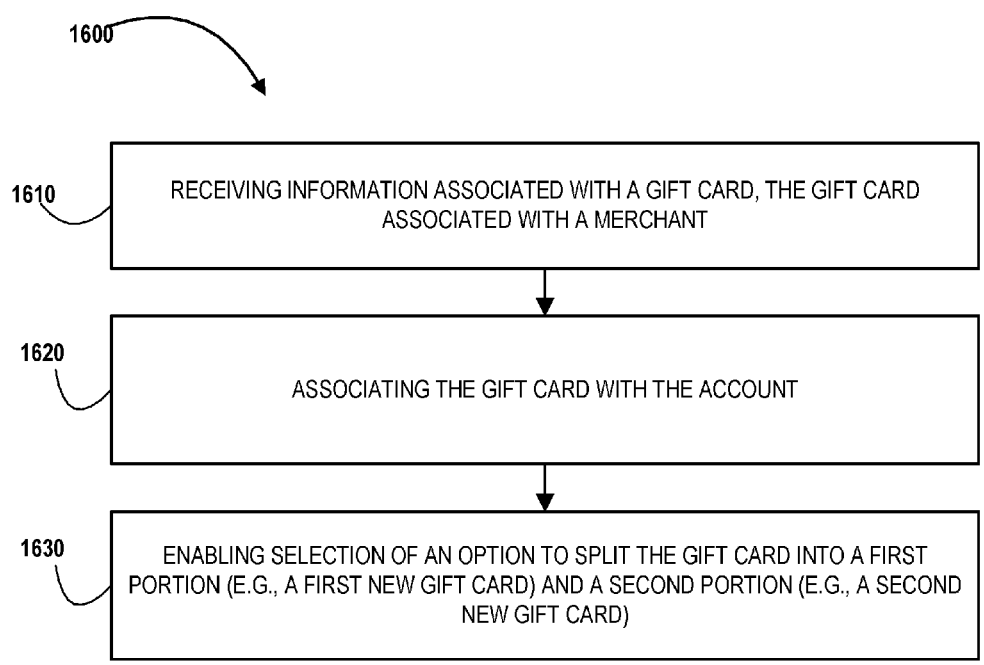
Figure 17:
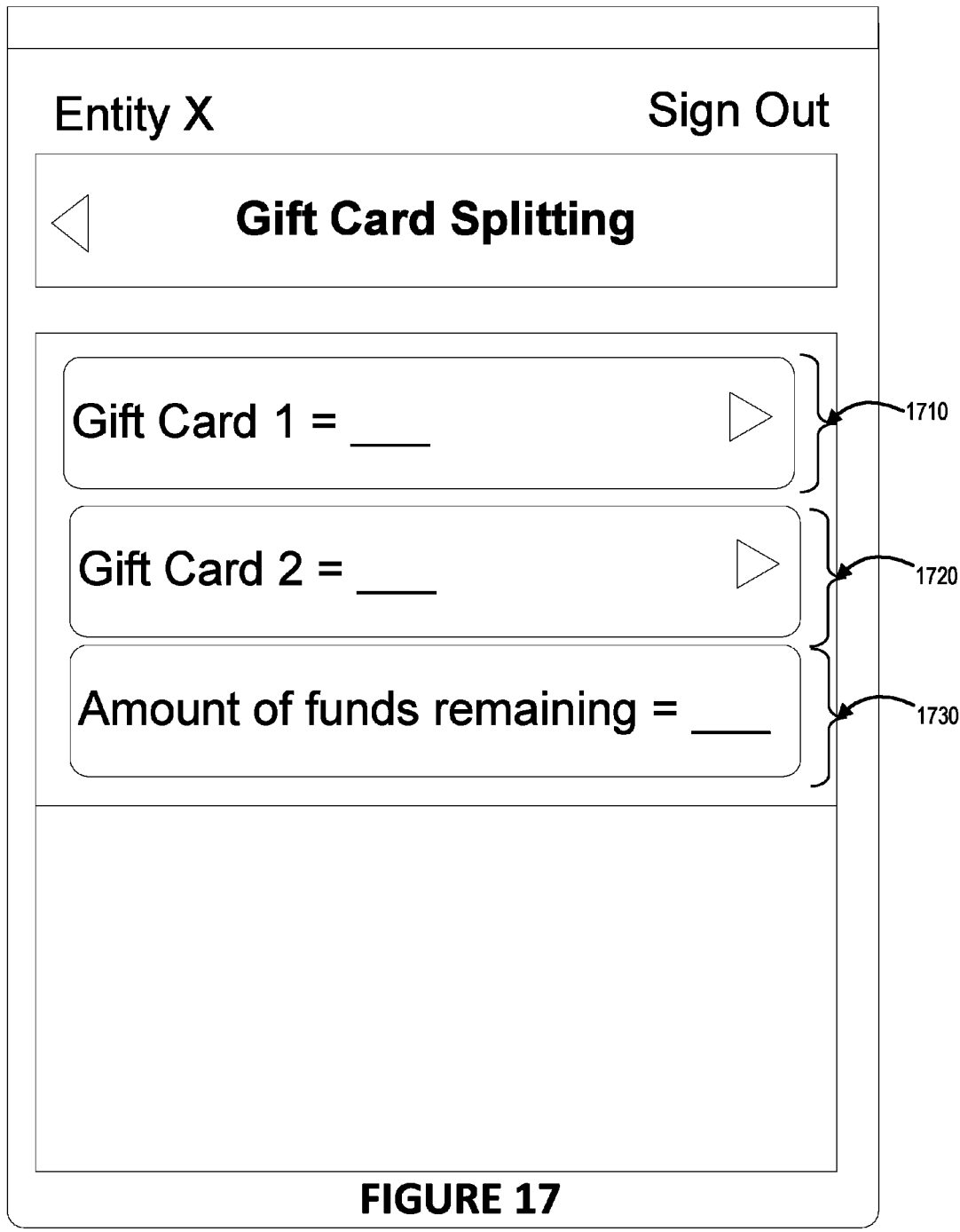
Figure 18:
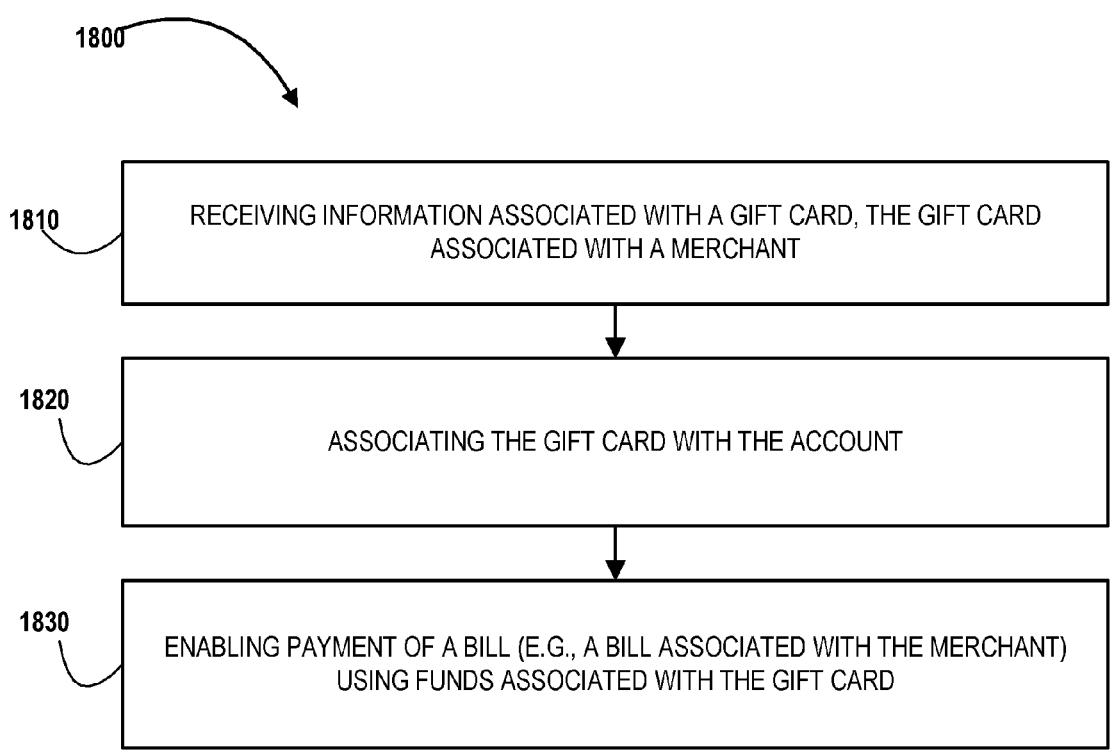

Having thus described embodiments of the invention in general terms, reference will now be made to the accompanying drawings, where:

FIG. 1 is a flowchart illustrating a general process flow for implementing gift card association, in accordance with embodiments of the present invention;

FIG. 2 is a block diagram illustrating technical components of a system for implementing the various processes described herein, in accordance with embodiments of the present invention;

FIGS. 3-7 are exemplary user interfaces for implementing gift card association, in accordance with embodiments of the present invention;

FIG. 8 is a flowchart illustrating a general process flow for implementing gift card redemption, in accordance with embodiments of the present invention;

FIG. 9 is another flowchart illustrating a general process flow for implementing gift card redemption, in accordance with embodiments of the present invention;

FIG. 10 is another flowchart illustrating a general process flow for enabling a user to customize gift card application to a transaction, in accordance with embodiments of the present invention;

FIGS. 11-12 are exemplary user interfaces for enabling a user to customize gift card application to a transaction, in accordance with embodiments FIG. 13 is a flowchart illustrating a general process flow for transmitting information to an entity (e.g., a merchant) after associating a gift card with an account, in accordance with embodiments of the present invention;

FIG. 14 is a flowchart illustrating a general process flow for determining an offer based on the gift card, in accordance with embodiments of the present invention;

FIG. 15 is a flowchart illustrating a general process flow for issuing a rebate as a gift card, in accordance with embodiments of the present invention;

FIG. 16 is a flowchart illustrating a general process flow for splitting a gift card, in accordance with embodiments of the present invention;

FIG. 17 is a user interface for splitting a gift card, in accordance with embodiments of the present invention; and FIG. 18 is a flowchart illustrating a general process flow for enabling bill payment using a gift card, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for implementing gift card association. An exemplary system is configured to receive information associated with a gift card, associate the gift card with the account, receive information associated with a transaction, determine the transaction qualifies for the gift card, and apply funds associated with the gift card to the transaction. Therefore, the present invention enables a user to associate a gift card with a user's account (e.g., a financial institution account). The invention enables the user to efficiently use the funds associated with a gift card. Additionally, the invention enables a user to utilize funds associated with multiple gift cards using a single payment method (e.g., an electronic or physical payment card associated with the user's account).

In some embodiments, an "entity" or "organization" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. The entity may manage the system described herein. An "account" may be the relationship that the user has with the entity. Examples of accounts include a deposit account, such as a transactional account (e.g., a banking account), a savings account, an investment account, a money market account, a time deposit, a demand deposit, a pre-paid account, a debit account, a credit account, a non-monetary user profile that includes only personal information associated with the user, or the like. The account is associated with and/or maintained by the entity. In other embodiments, an entity may not be a financial institution. In still other embodiments, the entity may be the merchant (e.g., the merchant that issued the gift card).

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded, or the like). Additionally, the user may receive or purchase a gift card associated with a merchant.

Referring now to FIG. 1, a general process flow 100 is provided for implementing gift card association. At block 110, the method comprises receiving information associated with a gift card. At block 120, the method comprises associating the gift card with the account (e.g., a financial institution account). At block 130, the method comprises receiving information associated with a transaction. At block 140, the method comprises determining the transaction qualifies for the gift card. At block 150, the method comprises applying funds associated with the gift card to the transaction.

The system (e.g., a system associated with the financial institution) is configured to associate funds associated with the gift card with a transaction associated with a merchant that issued the gift card. Therefore, a transaction qualifies for the gift card when the transaction is associated with a merchant that issued the gift card. Additionally, if the gift card is restricted to certain predetermined types of purchases (e.g., electronics, items over $10, or the like), then the transaction qualifies for the gift card if the transaction matches one of the predetermined types of purchases.

The gift card may or may not have an expiry date. If the gift card has an expiry date, funds associated with the gift card may not be utilized after the expiry date for any transactions executed by the user. If the system redeems the entire amount (or a partial amount) of the gift card prior to the expiry date (and prior to any transactions that qualify for the gift card), the redeemed amount of gift card funds may be available to the user even after the expiry date of the gift card. As used herein, redeeming a gift card by the system may refer to receiving funds associated with the gift card from the merchant. The redemption process is described in further detail below.

A transaction is executed by a user using a payment method associated with the account. Since the gift card has been integrated into the account, the transaction is not executed using the gift card. The payment method comprises at least one of a payment card payment, an electronic funds transfer, or a mobile device payment. The payment methods are not limited to those described herein.

Applying funds associated with the gift card to the transaction comprises determining whether an amount of the transaction is greater than an amount associated with the gift card. If the amount associated with the transaction is not greater than (e.g., less than or equal to) the amount associated with the gift card, the funds associated with the gift card are applied to the transaction. Consequently, the gift card balance is reduced. If the amount associated with the transaction is greater than the amount associated with the gift card, the funds associated with the gift card are applied to the transaction, and general funds (e.g., non-gift card funds) associated with the account are applied to the remainder of the transaction. Therefore, the gift card balance is reduced to zero. Thus, when the transaction amount is greater than the available gift card funds (or when the user wishes to pay for a transaction using both gift card funds and general funds), the present invention enables a user to execute a single payment transaction for using both gift card funds and general funds. Therefore, when the transaction amount is greater than the available gift card funds, the user does not need to execute a first transaction for using gift card funds and a second transaction for using general funds.

When a transaction qualifies for a gift card, funds associated with the gift card are applied to the transaction. Therefore, when a user views (e.g., on the on the user's account) a gift card balance immediately after the transaction, the gift card's balance is reduced. Alternatively, when a transaction qualifies for a gift card, general funds (and not gift card funds) associated with the account are applied to the transaction. Therefore, when a user views a gift card balance immediately after the transaction, the gift card's balance is not reduced, but the general funds' balance is reduced. When processing the account (e.g., settling the transaction) at a predetermined time in the future, the gift card's balance is reduced by the amount of the transaction, and the general funds' balance is increased by the amount of the transaction.

For example, an account may be associated with a $50 gift card and the user executes a $100 purchase transaction using a payment method associated with the account. As used herein, execution of a transaction may comprise authorization of a transaction. Therefore, the user authorizes $100 from the account to be applied to the transaction. Upon or during authorization of the transaction, general funds ($100) are applied to the transaction while gift card funds are not applied to the transaction. At settlement of the transaction which occurs a predetermined period following authorization of the transaction (e.g., a few seconds, minutes, hours, or days later), $50 of gift card funds and $50 of general funds are applied to the transaction. Alternatively, during the authorization of the transaction or in near real-time following authorization of the transaction, the system authorizes $50 of gift card funds and $50 of general funds to be applied to the transaction.

Receiving information associated with the gift card comprises at least one of receiving an image of the gift card, receiving readable indicia associated with the gift card, or receiving manual input associated with the gift card. Therefore, a user may capture an image of a gift card (front and/or back face of card) and upload the image to the user's account. Alternatively, a user may capture an image of an email that includes information associated with a gift card or a picture of a gift card. The system may process the image to extract various information associated with the card. Information associated with the card may include an identification code (e.g., card number) associated with the gift card, an amount of the gift card, a merchant associated with the gift card, type of purchases for which the card can and/or cannot be used, expiry date of the card, authentication credentials (e.g., personal identification PIN code) associated with the card, periodic transaction assessment associated with the card, a name of the user assigned to the gift card, types of purchases that qualify for purchases associated with the gift card, or the like. Alternatively, a user may manually input information associated with the card. Therefore, a user may access a user interface associated with the account and manually input information associated with the card.

As described previously, receiving information associated with the gift card may comprise receiving readable indicia associated with the gift card. The readable indicia may comprise any indicia, visual or non-visual, associated with the gift card (e.g., located on the gift card), where information associated with the indicia is receivable or readable (e.g., scannable) by a mobile device. The readable indicia may comprise visual indicia, e.g., a barcode, a Quick Response (QR) code, or the like. The readable indicia may comprise any one-dimensional or two-dimensional code. Therefore, the user may use a mobile device that comprises an image-capturing component (e.g., a camera) to capture the image of the readable indicia. As a further example, the readable indicia is comprised in a tag (e.g., radio frequency identification (RFID) tag, near field communication (NFC) tag, or the like) located on the card. A user may bring a mobile device in close proximity to the tag in order to receive information (e.g., readable indicia) associated with the tag. Upon receiving the readable indicia, the mobile device may prompt the user to upload the readable indicia to the user's account. The user may subsequently upload the readable indicia to the user's account.

The gift card may comprise a physical gift card (e.g., a gift card, a gift card printed on paper). Alternatively, the gift card may comprise an electronic gift card. A user may manually input information associated with the electronic gift card using the user interface associated with the user's account. Alternatively, the user's account may enable the user to directly import information associated with the electronic gift card into the user's account.

The system is configured to communicate with the merchant to redeem the gift card. The system is configured to communicate with the merchant to redeem the gift card either before or after receiving information associated with the transaction. Therefore, prior to, substantially simultaneously with, or after the transaction occurs, the system transmits information associated with the gift card (and/or information associated with the transaction) to the merchant. As an example, upon associating the gift card with the account and prior to a transaction that qualifies for the gift card, the system may transmit information associated with the gift card to the merchant, and the merchant may transmit the entire amount (or a partial amount) of funds associated with the gift card to the system. Alternatively, either substantially simultaneously with, immediately after, or a predetermined period after the transaction, the system may transmit information associated with the gift card and information associated with the transaction (e.g., transaction amount) to the merchant. The merchant may then transmit the amount associated with the transaction to the system. Alternatively, the system may wait until the entire amount of the gift card has been used for a transaction (or transactions) that qualifies for the gift card before communicating with the merchant to redeem the entire amount associated with the gift card.

The funds associated with the gift card may be referred to as gift card funds. The system is configured to add a predetermined amount of extra funds to the gift card funds. The system may be configured to add the predetermined amount of extra funds immediately after the user integrates the gift card into the account, or a predetermined period after the user integrates the gift card into the account. This may serve as an incentive to the user to utilize the invention described herein.

The user may associate multiple gift cards with the user's account. The system may enable the user to organize the multiple gift cards. For example, the system may enable the user to group gift cards associated with a certain type (e.g., home furnishings), a certain location (e.g., a certain mall, zip code, or the like), a certain amount, a certain expiry date, a user associated with the gift card, or the like. For example, an account may be a joint account associated with a husband and a wife. The husband may upload a first gift card and select an option on the account user interface to associate the first gift card with transactions executed by at least one of the husband or the wife. The wife may upload a second gift card and select an option on the account user interface to associate the second gift card with transactions executed by at least one of the husband or the wife.

As used herein, the account may be a financial institution account. Alternatively, the account may be a social networking account. Alternatively, the account may be a merchant account associated with the user. A merchant account is an account established by the user associated with the merchant (e.g., a user account established on the merchant's website).

The transaction associated with the gift card may be processed (e.g., by a financial institution) as a debit or credit transaction or similar to a debit or credit transaction. Therefore, the gift card transaction is essentially a debit or credit transaction. For example, when the user makes a purchase for $150, and uses a $50 gift card to pay part of the transaction and uses the user's credit card to pay the remainder of the transaction, the entire transaction may be processed as a $150 credit (or debit) transaction. The gift card funds may be held in a gift card account (or pseudo gift card account) that is associated with an account (e.g., a financial institution account) that holds the general funds described herein.

The user may associate multiple gift cards (e.g., a first gift card, a second gift card, or the like) with an account. Each gift card may be associated with its own pseudo gift card account. Therefore, both the first and second gift cards may qualify to be applied to a transaction. When both the first and second gift cards qualify to be applied to a transaction, an entire amount of the first gift card is first applied to the transaction, and the second gift card (followed by general funds) are applied to the remainder of the transaction. Either prior to or during the transaction, the user may select the first gift card to be applied to the transaction (e.g., using the user's mobile device). Alternatively, the system may have pre-configured rules for applying gift cards to the transaction. For example, a gift card associated with a smaller amount (or associated with an earlier expiration date) may be applied to the transaction before a gift card associated with a larger amount (or associated with a later expiration date).

Either prior to or during the transaction, the user may activate or deactivate a gift card. For example, prior to a transaction, the user may deactivate a gift card using the user's mobile device. If the gift card is deactivated, general funds associated with a user's account are applied to the user's transaction even though the transaction may qualify for the gift card. As a further example, if the user is executing a transaction using a mobile device, the mobile device user interface may prompt a user interface to pay for the transaction using at least one of funds associated with the gift card or general funds associated with the account. Therefore, the user may select the amount to the paid using the gift card and the amount to be paid using general funds. The user may select to pay the entire amount of the transaction using the gift card or using general funds.

The gift card may comprise a rebate issued by the merchant. For example, instead of issuing a rebate to an account of the user (e.g., when the user executes a transaction associated with an offer), a merchant may issue a gift card to the user's account. The gift card may be an electronic or digital gift card, and may be uploaded to the system described herein.

Referring now to FIG. 2, FIG. 2 presents an exemplary block diagram of the system environment 200 for implementing any of the process flows described herein, in accordance with embodiments of the present invention. As illustrated, the system environment 200 includes a network 210, a system 230, and a user input system 240. Also shown in FIG. 2 is a user 245 of the user input system 240. The user input system 240 may be a mobile device (e.g., a portable mobile communication device) described herein. The user 245 may be a person (e.g., an account holder) who uses the user input system 240 to execute a user application 247. The system 230 may be the external server described herein. The user application 247 and/or the system application 237 may incorporate one or more parts of the process flow 100 or any other function described herein. The user 245 may use the user input system 240 to upload information associated with a gift card to the user's account. The system 230 may process information associated with the gift card, associate the gift card with the user's account, process transactions associated with the account, or the like.

As shown in FIG. 2, the system 230, and the user input system 240 are each operatively and selectively connected to the network 210, which may include one or more separate networks. In addition, the network 210 may include a local area network (LAN), a wide area network (WAN), and/or a global area network (GAN), such as the Internet. The network may also include a mobile telecommunication network. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a network device, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be an external server as described herein. The system may be associated with (e.g., managed by) at least one of a financial institution, a merchant, or any other entity that may not be associated with the financial institution or the merchant. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, or the like.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of any process flow described herein. Additionally, the system 230 is configured to initiate presentation of any of the user interfaces described herein.

Figure 5:
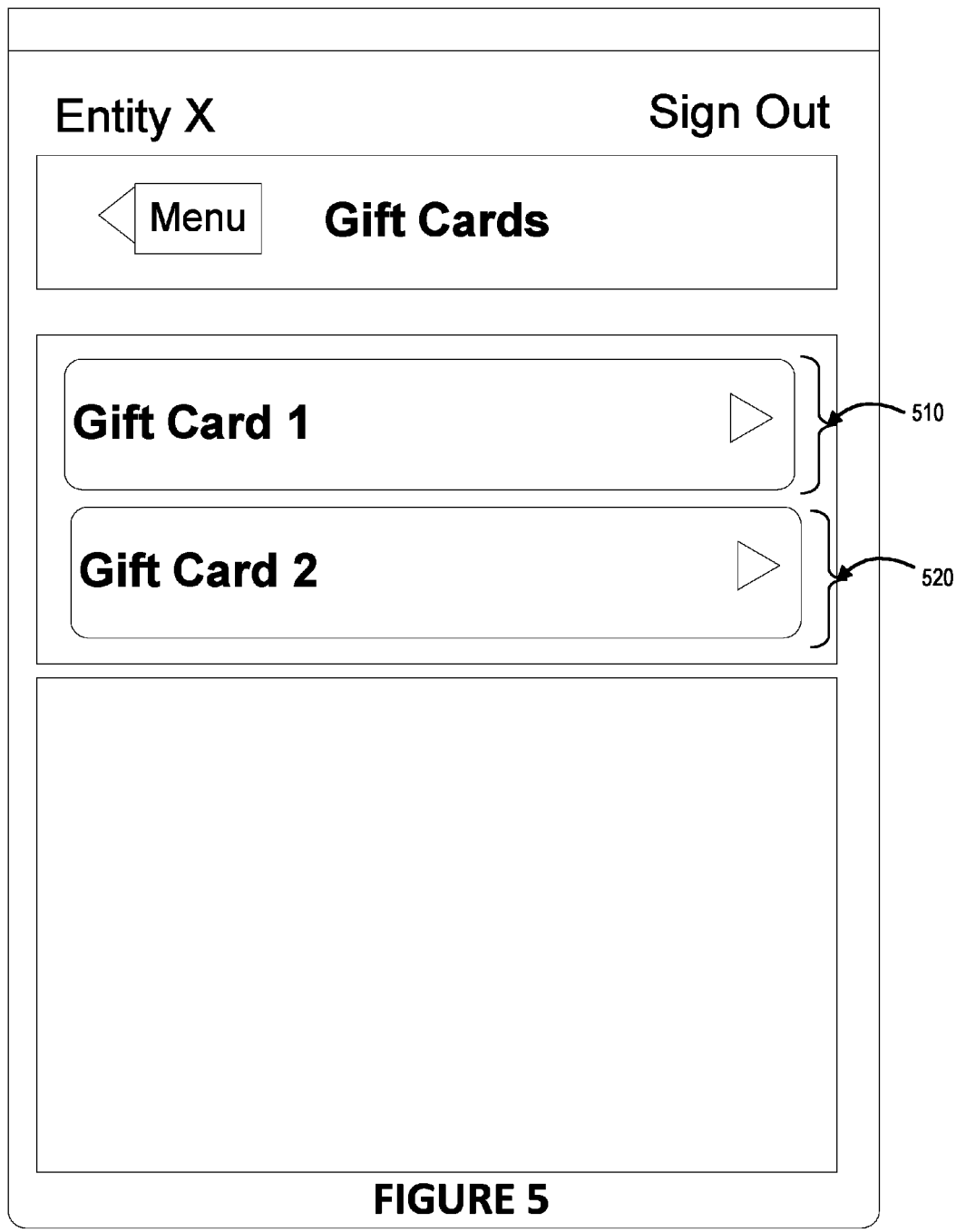
Figure 6:
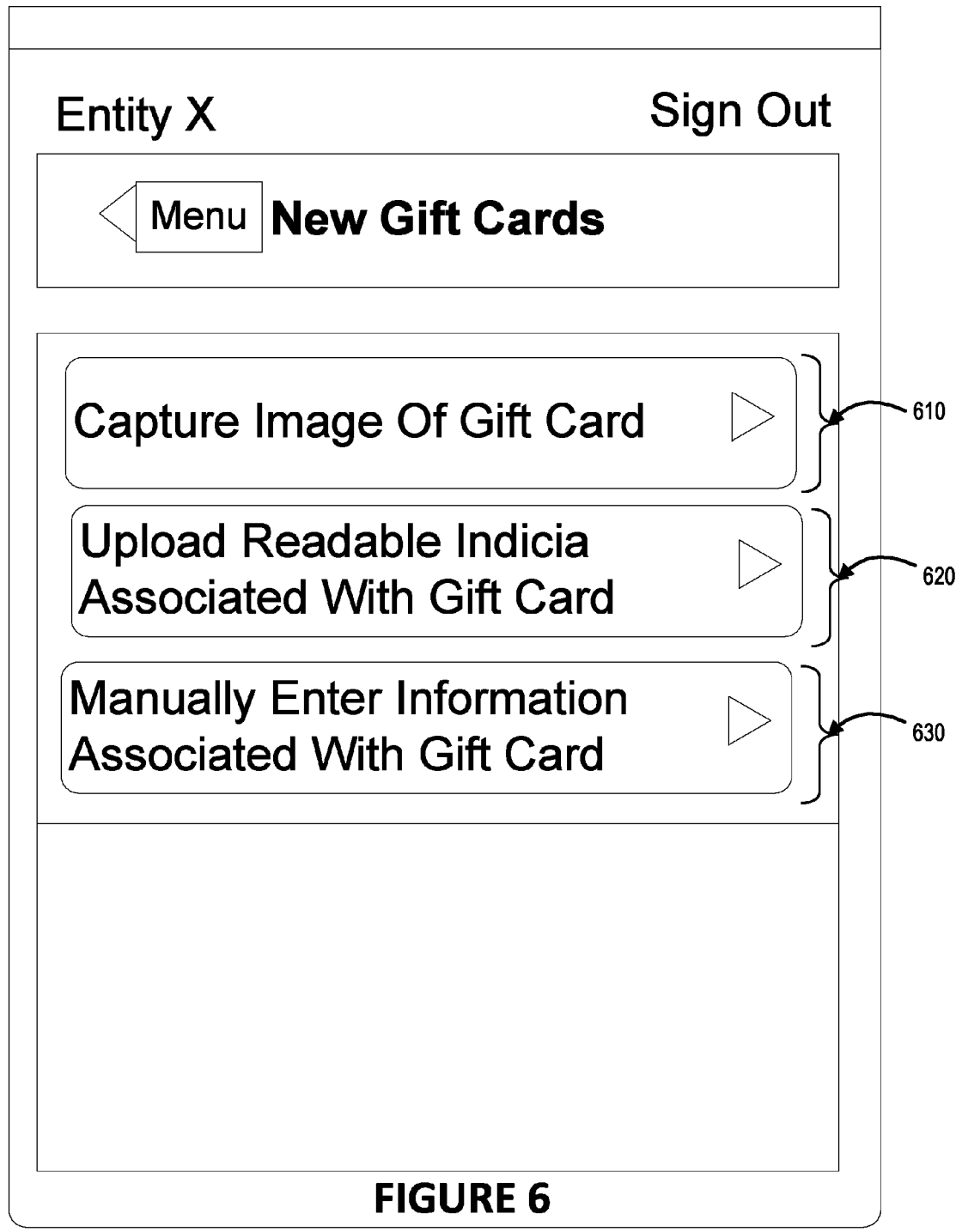
Figure 7:
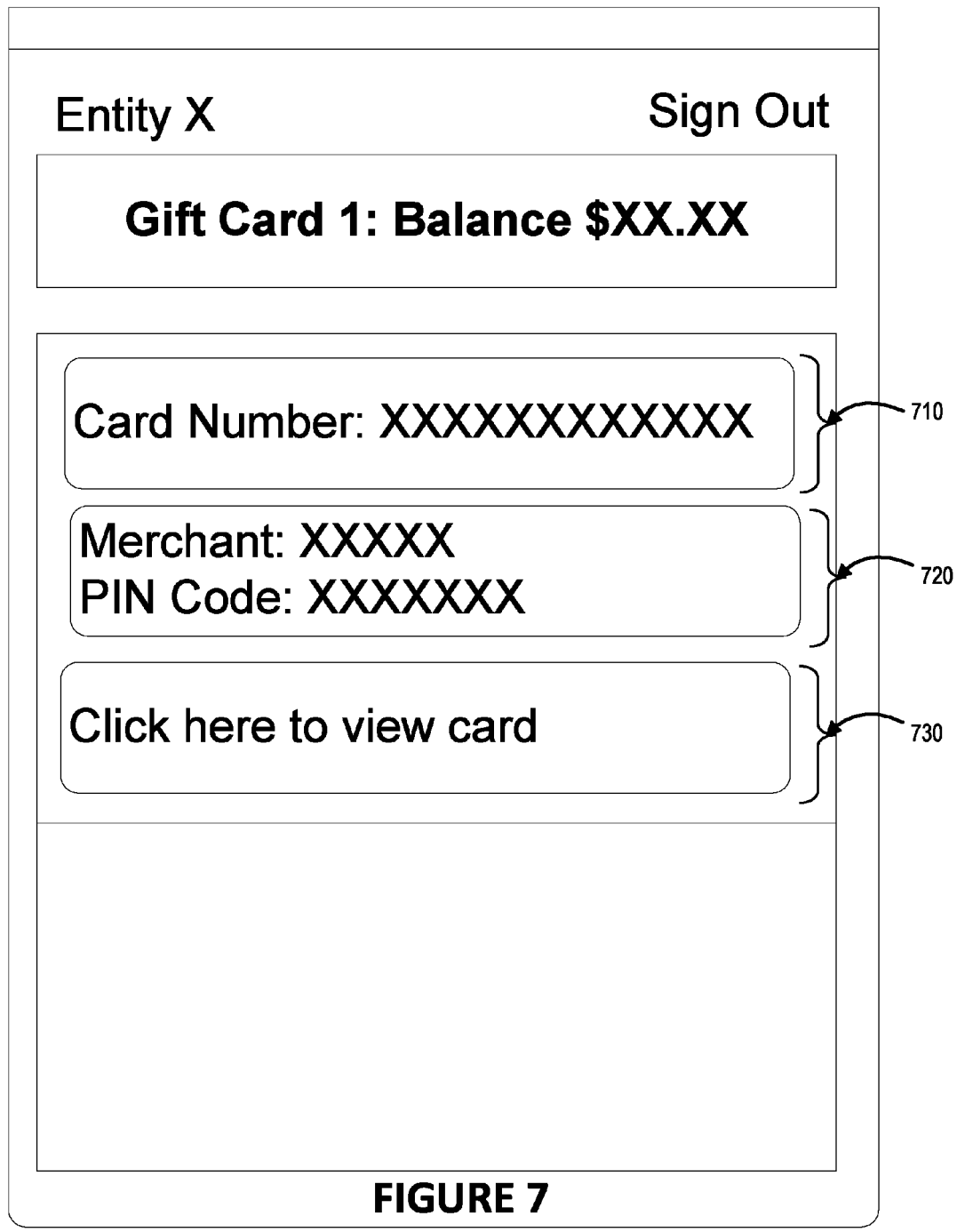

Referring now to FIGS. 3-7, FIGS. 3-7 are exemplary user interfaces for implementing gift card association, in accordance with embodiments of the present invention. A user may authenticate to the user's account. When the user authenticates to the user's account, the user is transported to the user interface presented in FIG. 3. The user interface comprises links to the user's savings/checking account 310 (e.g., general funds) and the user's gift cards 320. When the user selects the gift cards option, the user is transported to the user interface presented in FIG. 4. The user interface enables the user view gift cards 410 or upload a new gift card 420. When the user selects the option to view gift cards 410, the user is transported to the user interface presented in FIG. 5. The user interface in FIG. 5 presents a first gift card 510 and a second gift card 520. When the user selects the option to upload a new gift card 420 in FIG. 4, the user is transported to a user interface for uploading new gift cards. On this user interface (visible in FIG. 6), the user is presented with options to capture an image of a gift card 610, upload readable indicia associated with a gift card 620, or manually enter information associated with a gift card 630. When the user selects the first gift card 510 in FIG. 5, the user is transported to the user interface presented in FIG. 7. FIG. 7 indicates the balance associated with the first gift card. Additionally, the user interface presents the card number 710, the merchant 720 associated with the gift card, and the PIN code 720 associated with the gift card. Additionally, the user interface presents an option 730 for the user to view an image of the card. This option is presented when the image of the card is uploaded to the system.

Referring now to FIG. 8, a general process flow 800 is provided for redeeming a gift card. At block 810, the method comprises receiving information associated with a gift card, the gift card associated with a merchant. At block 820, the method comprises associating the gift card with the account (e.g., a financial institution account). At block 830, the method comprises transmitting a redemption request to an entity, the redemption request for redeeming funds associated with the gift card. At block 840, the method comprises receiving funds associated with the gift card from the entity (e.g., based on selling the gift card to the entity). Funds associated with the gift card may comprise credit, debit, or the like. As used herein, receiving funds associated with the gift card enables the system to provide a credit associated with the received amount to the user. This credit is visible to the user as the amount associated with the gift card (may also be referred to as gift card funds). In alternate embodiments, the system is configured to display the amount associated with the gift card to the user without transmitting a redemption request to the entity and/or receiving funds from the merchant. The entity may comprise the merchant associated with the gift card or may comprise some other entity not associated with the merchant.

A financial institution may redeem the funds associated with the gift card immediately upon associating the gift with a financial institution account so that the financial institution benefits from increased deposited funds. Additionally, the financial institution may immediately redeem the funds associated with the gift card so that the financial institution does not have to communicate with a merchant after a user executes a transaction that qualifies to be paid with funds associated with the gift card.

The redemption request may be transmitted to the entity (e.g., the merchant or some other entity) by at least one of the user or the financial institution that manages the system described herein. The user or the financial institution may determine whether to and when to transmit the redemption request to the entity for redeeming the gift card.

The system may be configured to transmit the redemption request to the merchant upon (e.g., immediately upon) or a predetermined period after associating the gift card with the account. The request may be for an entire amount of funds associated with a gift card, or for a partial amount of funds associated with the gift card. The amount of funds received by the system from the merchant may be at least one of less than, equal to, or greater than the amount requested in the redemption request (and/or the amount of the gift card). Therefore, upon associating the gift card with the account and prior to a transaction that qualifies for the gift card, the system may transmit a redemption request to the merchant, and the merchant may respond by transmitting the entire amount (or a partial amount) associated with the gift card to the system.

The redemption request may be transmitted via at least one of a wired or wireless network. The merchant may accept or reject the redemption request. If the merchant rejects the redemption request, the merchant does not transmit any funds to the system. If the merchant accepts the redemption request, the merchant transmits at least one of an entire or partial amount of the funds requested in the redemption request. There may be a predetermined period between the merchant's receipt of the redemption request and the merchant's transmission of the funds associated with the gift card to the system.

The redemption request may comprise information associated with the gift card as described herein. Additionally, the redemption request may comprise information associated with the user, information associated with the account, or the like. Information associated with the user may comprise a name of the user, contact information of the user, or the like. Information associated with the account may comprise transaction history (e.g., transactions associated with the merchant).

In some embodiments, the system may be configured to transmit the redemption request to the merchant substantially simultaneously with (e.g., in real-time or near real-time), immediately after, or a predetermined period after receiving information associated with a transaction that qualifies for the gift card. The redemption request may comprise information associated with the user, information associated with the account, information associated with the transaction, or the like. Information associated with the transaction may comprise an amount of the transaction, address of where the transaction occurred, items purchased, date and/or time of transaction, payment method used for the transaction, or the like. The merchant may then transmit the amount associated with the transaction to the system. Alternatively, the system may wait until the entire amount of the gift card has been used for a transaction (or transactions) that qualifies for the gift card before transmitting a redemption request to the merchant.

Therefore, gift card funds (e.g., an entire amount or less than an entire amount of the gift card funds) may be redeemed upon associating the gift card with the account, or the gift card funds associated with each transaction may be redeemed upon execution of each transaction that qualifies for the gift card funds. The merchant may benefit if the gift card funds are redeemed because a transaction associated with redeemed gift card funds is a transaction associated with the system or the financial institution described herein (and may not involve the merchant). Therefore, the merchant may not need to track or monitor the gift card funds after the funds are redeemed by the system described herein.

The gift card funds may be available for use by the user (e.g., the funds may be applied to a qualifying transaction executed by the user) at least one of prior to or after redemption of the gift card funds (e.g., transmitting the redemption request to the merchant and/or redeeming funds associated with the gift card from the merchant). For example, if the user executes a transaction that qualifies for the gift card prior to the redemption of the funds, the transaction may be paid using gift card funds. Alternatively, if the user executes a transaction that qualifies for the gift card prior to the redemption of the funds, the transaction may be paid using general funds associated with the account. As a further example, if the user executes a transaction that qualifies for the gift card after redemption of the funds, the transaction may be paid using gift card funds.

Once the gift card funds are redeemed by the system, the gift card funds may be managed separately from general funds associated with the account. Therefore, the gift card funds may be presented separately from the general funds on a user interface associated with the account. As described herein, the gift card funds may be used for qualifying transactions. Alternatively, when the gift card funds are redeemed by the system, the gift card funds are merged with the general funds associated with the account. If the gift card funds are merged with the general funds, the user may use gift card funds for any transaction, regardless of whether or not the transaction qualifies for the gift card. In some embodiments, even when the gift card funds are managed separately from the general funds, the gift card funds may be used as general funds for any transaction (and not limited to just qualifying transactions).

Referring now to FIG. 9, a general process flow 900 is provided for redeeming a gift card. At block 910, the method comprises receiving information associated with a gift card, the gift card associated with a merchant. At block 920, the method comprises associating the gift card with the account (e.g., a financial institution account). At block 930, the method comprises transmitting a redemption request to an entity, the redemption request for redeeming funds associated with the gift card. At block 940, the method comprises receiving funds associated with the gift card from the entity. The funds may not be restricted to purchases associated with the merchant. Therefore, the present invention enables the system to receive funds associated with the gift card from the merchant (e.g., based on selling the gift card to the entity). Funds associated with the gift card may comprise credit, debit, or the like. As used herein, receiving funds associated with the gift card enables the system to provide a credit associated with the received amount to the user. This credit is visible to the user as the amount associated with the gift card (may also be referred to as gift card funds). In alternate embodiments, the system is configured to display the amount associated with the gift card to the user without transmitting a redemption request to the entity and/or receiving funds from the merchant. Funds associated with the gift card may comprise credit, debit, or the like. The features associated with process flow 800 may be applicable to process flow 900, and vice versa.

As described herein, the system associated with the financial institution redeems the gift card amount (or an amount less than or greater than the gift card amount) from the merchant (or some other third-party entity as described below). Upon (e.g., immediately upon or a predetermined period after) associating the gift card with the account, the system may transmit an offer to the user enabling the user to accept whether to redeem an amount associated with the gift card such that the redeemed amount may be used as general funds. Therefore, the funds may not be restricted or limited to purchases associated with the merchant. The offer may be transmitted via at least one of email, text or multimedia message, social network message, financial network message, or the like. The amount may be at least one of less than, equal to, or greater than the gift card amount (e.g., the face value of the gift card). For example, for a $25 gift card, the system may present an offer to redeem the gift card for $24. The message transmitted to the user may present selectable options enabling the user to either accept or reject the offer. If the user accepts the offer, the system transmits the redemption request to the merchant. If the user rejects the offer, the system does not transmit the redemption request to the merchant. The message may additionally present an assessment to the user for redeeming the gift card amount (e.g. $1). The invention is advantageous to the merchant because by redeeming the gift card, the merchant can keep track of gift cards associated with the merchant.

Alternatively, the message may enable the user to choose between redeeming the gift card with the merchant or redeeming the gift card with a different third-party entity. In some embodiments, the system may determine how to redeem the gift card without presenting the user with options regarding how to redeem the gift card. Therefore, in some embodiments, the system may transmit the redemption request described herein to a third-party entity, rather than the merchant associated with the gift card. The third-party entity may transmit an entire amount (or less than or greater than the entire amount) requested in the redemption request. The funds requested in the redemption request may be less than, equal to, or greater than the gift card amount. As used herein, a merchant that issued a gift card may refer to a merchant associated with the gift card, regardless of whether the merchant (or some other third-party entity) issued the gift card.

As a customer of an entity (e.g., a financial institution) associated with the system described herein, the user may eligible for one or more rewards. A reward may be the redemption of funds associated with the user's gift card. Therefore, the system may redeem the gift card as a reward to the user.

In other embodiments, the user may select an option to redeem the gift card funds as reward points or loyalty points. The system may access a formula to convert the gift card funds to reward points (e.g., one gift card dollar equals ten reward points). The user may then redeem the reward points for one or more rewards. In some embodiments, the reward points are restricted to rewards associated with the merchant associated with the gift card. In other embodiments, the reward points may be redeemed for rewards associated with any merchant and not just the merchant associated with the gift card.

Referring now to FIG. 10, a general process flow 1000 is provided for enabling a user to customize gift card application to a transaction. The process flow may be executed by a system described herein. At block 1010, the method comprises receiving information associated with a gift card, the gift card associated with a merchant. At block 1020, the method comprises associating the gift card with the account (e.g., a financial institution account). At block 1030, the method comprises determining the transaction qualifies for the gift card. At block 1040, the method comprises determining whether a user has selected a first option to apply funds associated with the gift card to the transaction or a second option to apply general funds associated with the account to the transaction. Therefore, the present invention enables a user to determine whether to apply gift card funds or general funds (e.g., non-gift card funds) to a transaction. The first option, the second option, and the third option (described below) may be presented on a user's computing device (e.g., mobile computing device). The system described herein receives the user's selection either prior to, during (e.g., substantially simultaneously with), or after the transaction is executed. Therefore, funds are applied to the transaction based on the user's selection.

As used herein, execution of a transaction may comprise authorization of the transaction. Therefore, in order to reconfigure funds applied to a transaction after a transaction is executed, the user's selection is received after authorization of the transaction, but before settlement of the transaction. In some embodiments, a user may not be able to reconfigure funds applied to a transaction after settlement of the transaction.

The first option and the second option may be associated with activating and deactivating the gift card. Therefore, when the first option is selected (e.g., on a user's computing device), the gift card is activated, and when the second option is selected, the gift card is deactivated. When the gift card is activated, gift card funds are applied to a transaction that qualifies for the gift card. When the gift card is deactivated, general funds, and not gift card funds, are applied to a transaction that qualifies for the gift card. When the gift card is deactivated, the gift card may be automatically reactivated following the next transaction that qualifies for the gift card (or following the duration of deactivation selected by the user, or following a selected number of transactions that qualify for the gift card, or the like). Alternatively, the gift card may need to be manually reactivated by the user. In alternate embodiments, activation and deactivation options may be provided independently of the first and second options described herein (e.g., selection of the first and/or second option does not activate and/or deactivate a gift card).

Additionally, the system initiates presentation of a third option to apply the funds associated with the gift card to a first portion (e.g., percentage amount, absolute amount, or the like) of the transaction and the general funds associated with the account to a second portion (e.g., percentage amount, absolute amount, or the like) of the transaction. The user may specify these amounts either prior to, during, or after the transaction. Therefore, when the system presents three options, the system receives selection of at least one of the first option, the second option, or the third option.

The system is configured to receive selection of the first option, the second option, or the third option (and settings associated with the each options) at least one of prior to, substantially simultaneously with, or after a user executes the transaction. For example, a setting associated with the third option is the percentage amount of the transaction to be paid or satisfied using gift card funds and the percentage amount of the transaction to be paid or satisfied using general funds.

For example, prior to the transaction, the user may use a computing device (e.g., the user's mobile device) to specify that the next transaction that qualifies for the gift card (or next predetermined number of transactions or transactions executed during a predetermined duration) is to be satisfied or paid using general funds and not using gift card funds. Therefore, when the user executes the transaction, the transaction is satisfied or paid using general funds, and not using gift card funds, even though the transaction qualifies to be satisfied or paid using gift card funds. As a further example, during the transaction that qualifies for the gift card, upon presenting the user's mobile device for payment (e.g., payment via mobile wallet), the mobile device user interface may present at least one of the first option, the second option, or the third option described herein. As a further example, upon presenting the user's payment card (e.g., credit card, debit card, or the like) for a purchase that qualifies for the gift card, a display of the payment terminal at the merchant may present at least one of the first option, the second option, or the third option described herein.

As a further example, the transaction may be executed such that the purchase is paid or satisfied using at least one of gift card funds or general funds. Following the transaction (e.g., following authorization of the transaction, following settlement of the transaction, or the like), the user may select the executed transaction on an account interface (e.g., financial institution account interface) and reconfigure the payment of the purchase (or the funds applied to the transaction) such that the payment is made using funds selected by the user (e.g., gift card funds, general funds, or a combination of gift card funds and general funds).

The system may incent the user to use the gift card in several possible ways. An incentive may comprise at least one of increasing the amount of funds associated with the gift card, transmitting a rebate (e.g., cash back) to the user's account, transmitting a reward (e.g., reward points) to the user's account, transmitting an offer to the user's account, or the like. For example, the system may provide the incentive if the user executes a transaction at least one of: using a certain payment method (e.g., a credit transaction rather than a debit transaction), within a certain time frame, associated with a certain merchant, associated with a certain minimum or maximum transaction amount, or the like. As a further example, the system may provide the incentive if the user transmits the redemption request and/or redeems the gift card either before or after a specific date (or within a specified time frame). The system may inform the user (e.g., by transmitting a message to the user) of the incentives and how to earn the incentives upon associating the gift card with the account or a predetermined period after associating the gift card with the account. The message may be transmitted to the user via at least one of email, text or multimedia message, social network message, or financial institution network message.

Referring now to FIGS. 11-12, FIGS. 11-12 present exemplary user interfaces associated with the process described in FIG. 10. FIG. 11 illustrates the first option 1110, the second option 1120, and the third option 1130 described herein. As described herein, the user may select an option either prior to, during, or after executing a transaction that qualifies for the gift card. When the user selects the third option 1130, the user interface in FIG. 12 is presented to the user. On the user interface presented in FIG. 12, the user may define the percentage or absolute amount of gift card funds 1210 to be applied to a transaction that qualifies for the gift card, and the percentage or absolute amount of general funds 1220 to be applied to a transaction that qualifies for the gift card.

Referring now to FIG. 13, a general process flow 1300 is provided for transmitting information to an entity (e.g., a merchant) after associating a gift card with an account. The process flow may be executed by a system described herein. At block 1310, the method comprises receiving information associated with a gift card, the gift card associated with a merchant. At block 1320, the method comprises associating the gift card with an account (e.g., a financial institution account). At block 1330, the method comprises transmitting information to an entity, the information being associated with at least one of the gift card, the account, or a user associated with the account. The entity may comprise at least one of the merchant associated with the gift card or the entity (e.g., the financial institution) managing the system described herein. The present invention enables the entity (e.g., the merchant) to learn the identity of the user in possession of the gift card along with contact information of the user.

Referring now to FIG. 14, a general process flow 1400 is provided for determining an offer based on the gift card. The process flow may be executed by a system described herein. At block 1410, the method comprises receiving information associated with a gift card, the gift card associated with a merchant. At block 1420, the method comprises associating the gift card with an account (e.g., a financial institution account). At block 1430, the method comprises determining an offer based on the gift card, wherein the offer enables the account to receive a discount or rebate on a transaction. Therefore, the present invention additionally enables the system to transmit an offer to the user. The offer may motivate the user to execute a transaction that qualifies for at least one of the gift card or the offer.

In some embodiments, determining an offer based on the gift card comprises determining the offer based on determining a transaction determining a transaction that was executed using funds associated with the gift card. Therefore, the system may be configured to determine an offer based on the user having executed a transaction that qualifies to be paid with funds associated with the gift card. The offer (e.g., type of (product or service associated with) offer, amount of discount or rebate associated with the offer, merchant associated with offer, or the like) may be determined based on at least one of information associated with the transaction or information associated with the gift card.

Referring now to FIG. 15, a general process flow 1500 is provided for issuing or applying a gift card to an account. The process flow may be executed by a system described herein. At block 1510, the method comprises determining an offer associated with an account, wherein the offer was activated by a user of the account or automatically activated based on one or more pre-configured user preferences. At block 1520, the method comprises determining a transaction associated with the account. At block 1530, the method comprises determining the transaction qualifies for the offer. At block 1540, the method comprises determining a gift card based on at least one of the transaction or the offer. At block 1550, the method comprises issuing the gift card to the account. Therefore, the present invention enables a system to issue rebates associated with offers as gift cards (e.g., gift cards instead of monetary rebates applied to an account). The gift card may be associated with a merchant associated with the transaction or may be associated with a different merchant unassociated with the transaction. In addition to a gift card, the system may be configured to apply a rebate or discount associated with the offer to the account based on the system determining the transaction qualifies for the offer. If a transaction does not qualify for an offer, the system does not issue a gift card or a rebate to an account.

The system may be configured to transmit the information to the entity upon (e.g., immediately upon) associating the gift card with the account. Alternatively or additionally, the system may be configured to transmit the information to the entity at least one of before, substantially simultaneously with, or after receiving information associated with a transaction that qualifies for the gift card. Alternatively or additionally, the system may be configured to transmit the information to the entity periodically (e.g., every few days). Alternatively or additionally, the system may be configured to transmit the information to the entity based on occurrence of a triggering event (e.g., determining that the gift card has been unused for a predetermined period of time (e.g., following association of the gift card with the account or following possession of the gift card by the user), determining that the gift card balance is less than, equal to, or greater than a predetermined balance level, determining that the user's mobile device is within a predetermined distance of the merchant associated with the gift card, or the like).

The system may prompt the user prior to transmitting the information to the entity. The prompt may be presented on the user's computing device upon associating the gift card with the account or a predetermined period following association of the gift card with the account. The user may select an option to accept or reject transmitting the information to the entity.

Information associated with the account comprises a transaction history associated with the account. The transaction history comprises at least one of a type of a transaction, a frequency associated with the transaction, an amount associated with the transaction, or a merchant associated with the transaction. Information associated with an account may additionally comprise an account balance history (e.g., how the account balance changes over time). As used herein, a transaction may comprise a purchase, a deposit, a withdrawal, a credit, a debit, or the like. Information associated with the user comprises personal information associated with at least one of the user (or even a family member or friend associated with the user). Personal information comprises at least one of a name, a location, demographic information, salary information, contact information, residence address information, job profile information, education information, or social network information.

Information associated with the gift card may include at least one of an identification code (e.g., card number) associated with the gift card, an original value of the gift card, a current balance of the gift card, an age of the gift card, a merchant associated with the gift card, type of purchases for which the card can and/or cannot be used, expiry date of the card, authentication credentials (e.g., personal identification PIN code) associated with the card, periodic transaction assessment associated with the card, a name of the user assigned to the gift card, types of purchases that qualify for purchases associated with the gift card, a date of a last purchase that qualified for payment using the gift card, a date when the gift card was associated with the account, a transaction history associated with the gift card (e.g., purchases made using gift card funds), or the like.

The system may be configured to determine the user is within a predetermined distance of the merchant (e.g., based on determining global positioning system (GPS) coordinates associated with the user's mobile device). If the user's mobile device is determined to be located within the predetermined distance, the system is configured to transmit a message to the user reminding the user of the gift card. Additionally or alternatively, the system may be configured to transmit an offer to the user along with the message. The offer enables the user to receive at least one of a discount or a rebate on a future transaction (e.g., a future transaction associated with the merchant associated with the gift card, or a future transaction associated with a different merchant, or the like). The offer may expire a predetermined period after the offer is transmitted to or presented to the user (e.g., a day, a week, or the like). The message specifies the expiration date of the offer.

The entity may transmit an offer to the user based on the received information (e.g., information associated with at least one of the user, the account, or the gift card). The offer may be transmitted to the system described herein, and the system may retransmit the offer to the user. Alternatively, the offer may be generated by the system. The offer is transmitted to the user via at least one of text or multimedia message, email message, social network message, or financial institution network message. The offer and the gift card may be applied to the same transaction. Alternatively, the offer and the gift card may not be applied to the same transaction (e.g., the offer and the gift card may be applied to separate transactions associated with the same merchant or associated with different merchants). The user may select an option to accept (or activate) or reject the offer. When the user activates the offer, the offer is automatically associated with the user's account. When the user rejects the offer, the offer is not associated with the user's account.

The offer (or type of offer) may be determined based on at least one of the age of the gift card or a period of inactivity associated with the gift card. As used herein, an age of the gift card is at least one of the duration for which the user has possessed the gift card or the duration of the association of the gift card with the user's account. For example, if the user has possessed the gift card for a predetermined period (e.g., two months) but has not used the gift card on a qualifying transaction for a certain period, the offer may be transmitted to the user. As a further example, if the user associated the gift card with the user's account a predetermined period ago (e.g., two months) but has not used the gift card on a qualifying transaction during a certain period, the offer may be transmitted to the user. As a further example, if the user has not executed a transaction that qualifies for payment using the gift card for a predetermined period, the offer may be transmitted to the user. Additionally, the offer may be transmitted based on a balance associated with the gift card. If the gift card has a balance that is less than, equal to, or greater than a predetermined amount, the offer may be transmitted to the user based on this triggering event. Therefore, the triggering event for transmitting an offer to the user may comprise at least one of an age of the gift card, a duration of inactivity associated with the gift card, or a certain balance of the gift card. In some embodiments, the offer may be transmitted to the user based on a time frame determined by the merchant.

Additionally, the amount of the discount or rebate associated with the offer may be based on at least one of the age of the gift card, a duration of inactivity of the gift card, or a current balance of the gift card. For example, the discount or rebate associated with the offer may be greater if the gift card is older (e.g., greater than a predetermined duration), the period of inactivity is greater (e.g., greater than a predetermined duration), or the current balance is greater (e.g., greater than a predetermined amount). Alternatively, the discount or rebate associated with the offer may be smaller if the gift card is older, the period of inactivity is greater, or the current balance is greater.

The offer or the discount or rebate associated with the offer may comprise or be in the form of a second gift card (e.g., in process flow 1400 and/or any other process flow described herein). The second gift card and the original gift card may be applied to the same transaction. Alternatively, the second gift card and the original gift card may not be applied to the same transaction (e.g., the second gift card and the original gift card may be applied to separate transactions). When the offer comprises a gift card, the user may select an option to accept (or activate) or reject the second gift card. When the user activates the second gift card, the second gift card is automatically associated with the user's account.

In some embodiments, a transaction executed by the user qualifies for the offer based on the transaction occurring during a predetermined period. In some embodiments, the transaction qualifies for the offer based on an amount associated with the transaction being greater than a predetermined amount. In some embodiments, the system is further configured to determine, when processing or settling the transaction and/or the offer, whether the offer is active and whether the offer is valid. The offer is still active if the offer has not been revoked by at least one of the financial institution or the merchant and/or if the offer has not expired. The offer is still valid if the merchant associated with the offer is not excluded under any merchant exclusion rules at the time of settlement and if the user is not excluded under any user exclusion rules at the time of settlement. In some embodiments, the transaction qualifies for the offer based on a payment method associated with the transaction. Additionally, the transaction may be executed by any user in a household of users associated with the account.

The offer is transmitted to the user based on offer information associated with the offer substantially matching at least one of user information or account information associated with the user. The account information comprises a transaction history associated with the user's financial institution account, and the transaction history comprises at least one of a type of a transaction, a frequency associated with the transaction, an amount associated with the transaction, or a merchant associated with the transaction. User information comprises personal information associated with at least one of the user, a family member of the user, or a friend of the user, wherein the personal information comprises at least one of demographic information, salary information, contact information, residence address information, job profile information, education information, or social network information. In process flow 1500, the system may determine the gift card (e.g., type of gift card, amount of gift card, or the like) based on at least one of the user information or account information described herein.

The offer is transmitted to the user (and/or the gift card is issued to the user's account in process flow 1500) based on the user not being excluded by at least one user exclusion rule and the merchant not being excluded by at least one merchant exclusion rule. The at least one user exclusion rule comprises at least one of an affinity exclusion rule, a risk exclusion rule, or an account exclusion rule, and the at least one merchant exclusion rule comprises a merchant category code exclusion rule. The at least one merchant exclusion rule is based at least partially on a list of merchants associated with an excluded merchant category code that are not excluded.

As used herein, a user exclusion rule is a rule that excludes some users from receiving offers. In some embodiments, the at least one user exclusion rule comprises an affinity exclusion rule. Therefore, if the financial institution (or a merchant partner associated with the financial institution) already has an existing relationship (e.g., for providing or sending offers associated with the particular merchant) with some users via an affinity program, those users are excluded from receiving an offer. The affinity exclusion rule comprises at least one of a full affinity exclusion rule or a partial affinity exclusion rule. When the affinity rule comprises a full affinity exclusion rule, the user is completely excluded from receiving an offer (e.g., an offer associated with a particular merchant) if the financial institution (or a merchant partner associated with the financial institution) already has an existing relationship with the user. When the affinity rule comprises a partial affinity exclusion rule, the user is excluded from receiving an offer associated with a particular product, service, or industry associated with a particular merchant that already has an existing relationship with the user for the particular product, service, or industry, but the user may receive offers associated with other products, services, or industries associated with the particular merchant. Additionally or alternatively, the user is excluded from receiving an offer associated with a competitor of a particular merchant if that particular merchant already has an existing relationship with the user.

In some embodiments, the at least one user exclusion rule comprises a risk exclusion rule. Therefore, if a user is determined to be a risky user (e.g., has a credit score lower than a predetermined threshold), the user is excluded from receiving an offer. In some embodiments, the at least one user exclusion rule comprises an account exclusion rule. Therefore, for example, if a user's account has a balance (or another account characteristic) that is lower than predetermined threshold, the user is excluded from receiving an offer.

In some embodiments, a merchant exclusion rule is a rule that excludes some merchants from providing offers to users associated with the financial institution. In some embodiment, the at least one merchant exclusion rule comprises a merchant category code exclusion rule. Therefore, a merchant associated with a predetermined merchant category code (e.g., a healthcare code) is excluded from providing an offer. However, the financial institution may set up a list of merchants that trigger exceptions. Merchants that trigger exceptions can provide offers even if these merchants are associated with the excluded merchant category codes.

In some embodiments, the offer or the gift card is presented to the user on a portable mobile communication device. In some embodiments, the offer or the gift card is presented via at least one of a user interface associated with the user's financial institution account, a user interface associated with the user's merchant account, a user interface associated with the user's social network account, email, or text or multimedia message. For example, the offer is presented adjacent to a gift card associated with the user's account. In some embodiments, the offer comprises an offer to receive at least one of a discount or a rebate on (or a gift card for) at least one of: a purchase previously made by the user, a purchase from a merchant from which the user previously made a purchase, an alternative to the purchase previously made by the user, an alternative to the purchase from the merchant from which the user previously made a purchase, or a product or service related to a purchase previously made by the user. In some embodiments, the transaction comprises an aggregate of a plurality of purchase transactions or a largest purchase transaction. Therefore, the offer is applied to the aggregate of the plurality of purchases or to the largest purchase.

In some embodiments, the offer may specify that the user will receive a discount or rebate associated with the offer (or a gift card in process flow 1500) based on the user completing an activity and/or based on the user transmitting the offer to another user. For example, the offer may specify that the user has to complete an activity associated with the merchant associated with the offer, wherein the activity is independent of (or part of) the transaction. For example, if the offer is a 15% off offer on a minimum dine-in purchase of $50 at a restaurant, the activity may include purchasing merchandise (e.g., a T-shirt) at the restaurant. Alternatively the activity may include posting a message about the restaurant on a social network at a certain time. The activity may be independent of the user's dine-in purchase at the restaurant. Still additionally, the offer may specify that the user has to transmit the offer to a predetermined number of other users (e.g., ten other users), and may additionally specify that a predetermined percentage (e.g., 50%) of the users to whom the offer was transmitted need to execute a transaction associated with the offer either a predetermined period before or predetermined period after the user executes the transaction associated with the offer (or within a predetermined period after receiving the offer from the user). Therefore, a user successfully executes a transaction (i.e., receives a discount or rebate or a gift card) associated with the offer if, at settlement, the system determines the user completed the activity specified by the offer and/or transmitted the offer to the predetermined number of other users. Additionally, at settlement of the offer, the system may determine whether the predetermined percentage of users who received the offer from the user executed a transaction associated with the received offer within a predetermined period after receiving the offer from the user (or within a predetermined period either before or after the user's transaction associated with the offer).

In some embodiments, the processing or settlement of the transaction that qualifies for the offer is executed as part of a batch processing operation, wherein the batch processing operation comprises processing a plurality of financial institution accounts, wherein a discount or rebate associated with the offer is applied (or a gift card is issued as in process flow 1500) to a financial institution account of the user during or at the completion of the batch processing operation. In some embodiments, the clearance of the transaction comprises the processing or settlement of the transaction. Therefore, in some embodiments, the clearance of the transaction (and/or the offer) may also be referred to as the processing or settling of the transaction (and/or the offer). In other embodiments, the processing or settlement of the transaction is executed a predetermined period after clearance of the transaction.

Any features that are applicable to offers transmitted to an account may also be applicable to gift cards issued or transmitted to an account. Therefore, as used herein, in some embodiments, an offer may be referred to as a gift card, and a gift card may be referred to as an offer. Additionally, a discount or rebate associated with an offer (e.g., the discount or rebate that is applied to an account upon processing a transaction) may be a gift card that is issued to the account upon processing a transaction.

Referring now to FIG. 16, a general process flow 1600 is provided for splitting a gift card. The process flow may be executed by a system described herein. At block 1610, the method comprises receiving information associated with a gift card, the gift card associated with a merchant. At block 1620, the method comprises associating the gift card with an account (e.g., a financial institution account). At block 1630, the method comprises enabling selection of an option to split the gift card into a first portion (e.g., a first new gift card) and a second portion (e.g., a second new gift card). The present invention enables a user to split a gift card, and transmit the new gift cards to other users. When a second user receives the gift card from the user, the second user may either accept (e.g., activate) or reject the gift card. If the second user activates the gift card, the gift card becomes activated with the second user's account. As used herein, a gift card split may also be referred to as a new gift card. The user may use any of the transmission methods described herein to transmit (or transfer or re-gift) a gift card (e.g., the original gift card or the new gift card after splitting the original gift card) to a second user or to multiple second users.

The system may be configured to enable a user to determine an amount of funds (e.g., percentage amount, absolute amount, or the like) to be assigned to each new gift card. Alternatively, the system may be configured to automatically determine an amount of funds to be assigned to each new gift card based on pre-configured user preferences established by the user. Additionally, upon receiving the user's selection to split the gift card, the system may be configured to automatically set aside (or assign) an absolute or percentage amount of the gift card to the account (e.g., a savings portion of the account). The amount set aside may have been selected by the user prior to the user selecting the option to split the gift card or may be selected by the user upon the user selecting the option to split the gift card. The user may even choose not to set aside or assign an amount of the gift card to the account.

In addition to receiving the new gift card from the user, the second user may also receive information associated with the original gift card (e.g., identification information, balance information, or any other information associated with the original gift card) from the user. Features described herein that are applicable to the original gift card associated with the user are also applicable to the new gift card associated with the second user. For example, when the second user associates the new gift card with the second user's account, information associated with at least one of the new gift card, the second user, or the second user's account may be transmitted to an entity (e.g., the merchant) as described herein. As used herein, information associated with the new gift card may also comprise information associated with the original gift card. Additionally, information associated with the new gift card includes information indicating that the new gift card originated based on splitting the original gift card. This enables the entity to know where the new gift card originated from.

As a further example, the second user may redeem his or her new gift card based on the various processes described herein. For example, when the second user transmits a redemption request to an entity (e.g., the merchant), the second user's account may receive funds associated with the new gift card. The redemption request may comprise information associated with the new gift card and/or information associated with the original gift card that was received along with the transmission of the new gift card from the user. The amount of funds redeemed by the second user may be greater than, equal to, or less than the amount of funds associated with the new gift card.

The user may transmit the new gift card to the second user via at least one of email, text or multimedia message, a social network, or a financial institution network. Alternatively or additionally, the user may transmit the new gift card to an alias associated with the second user. For example, the alias may comprise a phone number, email address, or social networking identification information associated with the second user. Therefore, the second user may have pre-registered the second user's alias with the entity (e.g., financial institution) associated with the second user's account. Therefore, when the user sends the gift card to the alias, the entity receives the gift card, interprets the alias, and forwards the gift card to the second user's account. Therefore, the second user receives the gift card without providing the second user's account information to the user.

The new gift card may be transmitted to the second user via readable indicia, wherein the readable indicia comprises information associated with the new gift card. As used herein, information associated with a gift card may comprise a link to information associated with a gift card. For example, the user may use an application on the user's computing device (e.g., mobile device) to generate readable indicia associated with the new gift card that the user intends to transmit to the second user. The readable indicia may comprise any indicia, visual or non-visual, associated with the gift card, where information associated with the indicia is receivable or readable (e.g., scannable) by a mobile device. The readable indicia may comprise visual indicia, e.g., a barcode, a Quick Response (QR) code, or the like. The readable indicia may comprise any one-dimensional or two-dimensional code.

The user may present the readable indicia on the user's mobile device and may allow the second user to capture an image of the readable indicia using an image-capturing component (e.g., camera) associated with the second user's device. Alternatively, the user may transmit the readable indicia to the second user via at least one of email, text or multimedia message, social networking message, or financial institution network message. Upon receiving the readable indicia, the second user's device processes the readable indicia, and prompts the second user to accept (e.g., activate) or reject the new gift card. Upon accepting or activating the new gift card, the new gift card is associated with the second user's account. As a further example, the generated readable indicia is comprised in a tag (e.g., radio frequency identification (RFID) tag, near field communication (NFC) tag, or the like) associated with the user's computing device, wherein the tag is located inside or outside the user's computing device. The second user may bring a mobile device in close proximity to the tag in order to receive information (e.g., readable indicia) associated with the tag.

Referring now to FIG. 17, FIG. 17 presents an exemplary user interface for splitting a gift card. When the user selects an option to split the gift card, the user is presented with the user interface of FIG. 17. The user may define an absolute or percentage amount of funds to be applied to the first new gift card 1710, and an absolute or percentage amount of funds to be applied to the second new gift card 1720. Additionally, the user interface presents the amount of funds remaining 1730 in the original gift card based on subtracting the amounts applied to the new gift cards. If the user applies the entire balance of the original gift card to the new gift cards, the amount of funds remaining in the original gift card is zero. If the amount of funds remaining in the original gift card is zero, the system may be configured to communicate this information to the merchant. In some embodiments, the system may be configured to communicate the amount of reduced funds to the merchant, regardless of whether the amount of funds is reduced to zero. In some embodiments, the system may be configured to communicate to the merchant information (e.g., balance information) associated with the original gift card and the new gift cards upon the splitting of the original gift card. The system may or may not require user approval to transmit this information to the merchant.

Referring now to FIG. 18, a general process flow 1800 is provided for enabling bill payment using a gift card. The process flow may be executed by a system described herein. At block 1810, the method comprises receiving information associated with a gift card, the gift card associated with a merchant. At block 1820, the method comprises associating the gift card with an account (e.g., a financial institution account or merchant account associated with user). At block 1830, the method comprises enabling payment of a bill associated with the merchant using funds associated with the gift card. The present invention enables a user to apply gift card funds to a bill (e.g., a bill associated with a merchant associated with the gift card). Therefore, the gift card payment may be processed as a bill payment transaction.

The bill may be associated with a merchant associated with the gift card (may be referred to as the gift card merchant). Therefore, the bill may be for a merchant account associated with the user, wherein the merchant account is not associated with the gift card, but wherein a bill associated with the merchant account is electronically received into the user account (e.g., financial institution account) associated with the gift card. Alternatively, the bill may be associated with a merchant different from the merchant associated with the gift card. Therefore, a gift card associated with a first merchant may be used to pay a bill associated with a second merchant unassociated with the first merchant. As used herein, a merchant account may comprise a merchant-branded account such as a credit account. In alternate embodiments, the gift card may be associated with the user's merchant account, and the gift card can be used for paying a balance of the merchant account.

The account may comprise at least one of a credit or debit account. The account may even comprise a pre-paid account. In some embodiments, the account may comprise at least one of an online or mobile banking account. Therefore, if the user does not want to use the gift card funds to make a purchase associated with the merchant, the user may use the gift card funds to pay a bill associated with the user's merchant account or by applying the gift card funds to a balance of the user's merchant account.

As an example, the user may choose to use a $50 gift card to pay a bill. In order to use the gift card to pay the bill, the system described herein may enable the user to liquidate the gift card for less than the face value amount (e.g., $45) associated with the gift card. As used herein, the liquidated funds may be provided by the system (e.g., the financial institution associated with the account) or some other entity. Therefore, the user may apply the liquidated $45 to pay the bill. The entity (e.g., financial institution) associated with the system described herein may sell (or re-sell) the gift card to a third-party for $47, thereby enabling the entity to make a profit. Additionally, the user receives value because the user can use the gift card to pay the user's bill. The bill may or may not be associated with the merchant associated with the gift card.

Upon (e.g., immediately upon) associating the gift card with the account (or upon redeeming funds associated with the gift card) or a predetermined period following association of the gift card with the account (or a predetermined period following redemption of funds associated with the gift card), the system alerts the user to the option to pay a bill associated with the merchant using the gift card (e.g., a gift card associated with the same merchant). Therefore, the user may apply the gift card to a balance of a merchant account (or merchant-branded account such as a credit account) associated with the user. The alert may be communicated with at least one of an email, a text or multimedia message, a social network message, or a financial institution network message. Additionally or alternatively, the alert may be communicated via pop-up message on the user's computing device (e.g., mobile computing device). Additionally or alternatively, the alert may comprise an audio alert.

Upon associating the gift card with the account, the system may compare the name (or other identification information such as merchant identification number) of the merchant associated with the gift card with the name (or other identification information) of the merchant associated with the account (e.g., when the account is a merchant account) or the name (or other identification information) of a merchant associated with a bill that the user has pre-configured to associate with the account (e.g., via a bill pay feature associated with the account). A bill may be associated with an account or received by the account either before or after associating a gift card with the account. If the system finds a substantial match (e.g., to a predetermined degree of statistical confidence) between the identification information, the system presents to the user the option to enable bill payment using the gift card. Therefore, the system enables the user to pay the bill using gift card funds via a bill payment feature associated with the user's account (e.g., online banking account, mobile banking account, or the like). Additionally, or alternatively, the user may initiate an application (e.g., a mobile wallet application, a mobile payment application, or the like) on the user's mobile device, and apply the gift card to a balance of the user's merchant account using the application. Therefore, the user may apply the gift card to a balance of an account without issuance (or prior to issuance) of a bill associated with the account.

Using the various processes described herein, the system is configured to communicate with the merchant or another entity to transmit a redemption request and/or redeem the gift card before, substantially simultaneously with, or after enabling payment of the bill. In some embodiments, the system may be configured to enable payment of the bill without transmitting a redemption request and/or redeeming the gift card. As used herein, a first event that occurs substantially simultaneously with a second event may be equivalent to a first event occurring in "real-time" or in "near real-time" either during or following the second event.

The user may select an amount of gift card funds to apply to the bill payment. Therefore, the user may choose to apply an entire or partial amount of gift card funds to the bill payment. When the user selects an option to apply the gift card to a bill payment, the system applies the gift card to the bill. If the amount of the bill is greater than the amount of funds associated with the gift card, the system applies the funds (e.g., an entire amount of funds) associated with the gift card to the bill, and enables the user to select an option to apply general funds associated with the account to the remainder of the bill. Alternatively, the system may automatically apply general funds associated with the account to the remainder of the bill. As used herein, a bill may also refer to a balance of an account (e.g., a credit account). Therefore, paying a bill may also represent paying a balance of an account. The account may be the account associated with the gift card or a different account unassociated with the account associated with the gift card.

Any of the features described herein with respect to a particular process flow or interface are also applicable to any other process flow or interface. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. As used herein, the term "upon" may be substituted with "in response to." As used herein, execution of a transaction may comprise at least one of authorization of a transaction or settlement of a transaction.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for associating a gift card with an account, the apparatus comprising:
   a memory;
   at least one processor; and
   a module stored in the memory, executable by the at least one processor, and configured to cause the at least one processor to:

receive images of a gift card;

extract information associated with the gift card, wherein the gift card is associated with funds, wherein the information is extracted from the images of the gift card, wherein the information comprises an identification code associated with the gift card and an amount associated with the gift card;

associate the gift card with an account, wherein associating the gift card with an account further comprises:

initiating a presentation of a user interface for display on a user device, the user interface comprises one or more options to enable the user to establish a communicable link for transfer of information between the gift card and an account;

receiving a user selection of at least one of the one or more options, wherein the user selection comprises an indication that the user has initiated the communicable link for the transfer of information between the gift card and the account; and establishing the communicable link based on at least receiving the user selection;

determine the user is within a predetermined distance of a merchant associated with the gift card, based on determining global positioning system (GPS) coordinates associated with the user device;

based on determining the user is within the predetermined distance of the merchant, transmit a message to the user device informing the user of the gift card previously associated with the account, the message also comprising a new offer for a second merchant and specifying an expiry date for the new offer, wherein a discount or rebate of the new offer for the second merchant is based on an age of the gift card, a period of inactivity of the gift card, and/or a balance of the gift card;

determine execution of a transaction at the merchant;

receive information associated with the transaction;

determine the transaction qualifies for the gift card; and apply funds associated with the gift card to the transaction, wherein the transaction is executed using a payment method associated with the account, and wherein the transaction is not executed using the gift card.

2. The apparatus of claim 1, wherein the transaction qualifies for the gift card when the transaction is associated with the merchant.

3. The apparatus of claim 1, wherein the transaction qualifies for the gift card when the transaction is associated with a predetermined type of purchase.

4. The apparatus of claim 1, wherein the funds associated with the gift card are applied to the transaction without the user pre-selecting to apply the funds associated with the gift card to the transaction.

5. The apparatus of claim 4, wherein the payment method comprises at least one of a payment card payment, an electronic funds transfer, or a mobile device payment.

6. The apparatus of claim 1, wherein applying funds associated with the gift card to the transaction comprises:

determining an amount associated with the transaction is greater than the amount associated with the gift card;

applying funds associated with the gift card to the transaction; and applying general funds associated with the account to a remainder of the transaction.

7. The apparatus of claim 1, wherein applying funds associated with the gift card to the transaction comprises:

applying general funds associated with the account to the transaction when the transaction occurs, and after a predetermined period, reducing a balance of the gift card by an amount of the transaction and increasing a balance of the general funds by the amount of the transaction.

8. The apparatus of claim 1, wherein extracting information associated with the gift card comprises at least one of receiving an image of the gift card, receiving readable indicia associated with the gift card, or receiving manual input associated with the gift card.

9. The apparatus of claim 8, wherein the readable indicia is comprised at least one of a visual or non-visual code.

10. The apparatus of claim 8, wherein the readable indicia is comprised in a tag that transmits information wirelessly.

11. The apparatus of claim 1, wherein the gift card comprises a plurality of gift cards.

12. The apparatus of claim 1, wherein the account comprises at least one of a financial institution account, a social networking account, or a merchant account associated with the user.

13. The apparatus of claim 12, wherein the financial institution account comprises at least one of a credit account or a debit account.

14. The apparatus of claim 1, wherein the transaction is processed as a debit transaction.

15. The apparatus of claim 1, wherein the module is configured to communicate with the merchant to redeem the gift card before, substantially simultaneously with, or after receiving information associated with the transaction.

16. The apparatus of claim 1, wherein funds associated with the gift card comprise gift card funds, and wherein the module is configured to add extra funds to the gift card funds.

17. The apparatus of claim 1, wherein the gift card is categorized based on a location associated with a merchant associated with the gift card, a type associated with the gift card, the amount associated with the gift card, an expiry date associated with the gift card, and a user associated with the gift card.

* * * * *